United States Patent
Hiraiwa et al.

(10) Patent No.: US 10,553,880 B2
(45) Date of Patent: Feb. 4, 2020

(54) FUEL CELL

(71) Applicant: SUMITOMO ELECTRIC INDUSTRIES, LTD., Osaka-shi, Osaka (JP)

(72) Inventors: Chihiro Hiraiwa, Itami (JP); Masatoshi Majima, Itami (JP); Hiromasa Tawarayama, Itami (JP); Naho Mizuhara, Itami (JP); Takahiro Higashino, Itami (JP); Yohei Noda, Itami (JP); Kazunari Miyamoto, Itami (JP); Toshihiro Yoshida, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 125 days.

(21) Appl. No.: 15/743,851

(22) PCT Filed: Jul. 8, 2016

(86) PCT No.: PCT/JP2016/070326
§ 371 (c)(1),
(2) Date: Jan. 11, 2018

(87) PCT Pub. No.: WO2017/010435
PCT Pub. Date: Jan. 19, 2017

(65) Prior Publication Data
US 2018/0205096 A1  Jul. 19, 2018

(30) Foreign Application Priority Data
Jul. 16, 2015 (JP) .................................. 2015-142287
Jan. 29, 2016 (JP) .................................. 2016-016684

(51) Int. Cl.
*H01M 8/02* (2016.01)
*H01M 8/12* (2016.01)
(Continued)

(52) U.S. Cl.
CPC ............. *H01M 8/0232* (2013.01); *C25B 1/10* (2013.01); *C25B 9/08* (2013.01); *C25B 11/035* (2013.01);
(Continued)

(58) Field of Classification Search
CPC ............ H01M 8/02; H01M 8/04; H01M 8/12; H01M 8/0232; H01M 8/1213
See application file for complete search history.

(56) References Cited

U.S. PATENT DOCUMENTS 6,444,340 B1 * 9/2002 Jaffrey ................ H01M 8/0204
429/456
2002/0114990 A1 8/2002 Fly et al.
(Continued)

FOREIGN PATENT DOCUMENTS

EP    1353391 A1    10/2003
JP    2003-100323 A    4/2003
(Continued)

OTHER PUBLICATIONS

Machine Translation of: JP 2003-100323 A, Koji et al., Apr. 4, 2003.*

*Primary Examiner* — Kenneth J Douyette
(74) *Attorney, Agent, or Firm* — Drinker Biddle & Reath LLP

(57) ABSTRACT

A fuel cell includes a MEA that includes a cathode, an anode, and a solid electrolyte layer disposed between the cathode and the anode, the solid electrolyte layer containing an ion-conducting solid oxide; at least one first porous metal body arranged to oppose at least one of the cathode and the anode; and an interconnector arranged to oppose the first porous metal body and having a gas supply port and a gas discharge port formed therein. The first porous metal body includes a porous metal body S that opposes the gas supply port and has a three-dimensional mesh-like skeleton, and a
(Continued)

porous metal body H that has a three-dimensional mesh-like skeleton and is other than the porous metal body S. A porosity Ps of the porous metal body S and a porosity Ph of the porous metal body H satisfy a relationship: Ps<Ph.

12 Claims, 22 Drawing Sheets

(51) Int. Cl.

| | | |
|---|---|---|
| *H01M 8/0232* | (2016.01) | |
| *H01M 8/1213* | (2016.01) | |
| *C25B 9/08* | (2006.01) | |
| *H01M 8/0241* | (2016.01) | |
| *C25B 11/03* | (2006.01) | |
| *H01M 8/0245* | (2016.01) | |
| *C25B 1/10* | (2006.01) | |
| *H01M 8/1231* | (2016.01) | |
| *H01M 8/124* | (2016.01) | |
| *H01M 4/90* | (2006.01) | |
| *H01M 8/1253* | (2016.01) | |

(52) U.S. Cl.
CPC ....... *H01M 8/0241* (2013.01); *H01M 8/0245* (2013.01); *H01M 8/1213* (2013.01); *H01M 8/1231* (2016.02); *H01M 4/9033* (2013.01); *H01M 8/1253* (2013.01); *H01M 2008/1293* (2013.01); *H01M 2300/0077* (2013.01); *Y02E 60/525* (2013.01); *Y02P 70/56* (2015.11)

(56) References Cited

U.S. PATENT DOCUMENTS

| | | | |
|---|---|---|---|
| 2004/0101742 A1* | 5/2004 | Simpkins | ............ H01M 8/0232 |
| | | | 429/468 |
| 2004/0234836 A1 | 11/2004 | Orishima et al. | |
| 2011/0287340 A1 | 11/2011 | Mougin et al. | |
| 2013/0337366 A1 | 12/2013 | Blanchet et al. | |

FOREIGN PATENT DOCUMENTS

| | | | | |
|---|---|---|---|---|
| JP | 2003100323 A | * | 4/2003 | .............. H01M 8/02 |
| JP | 2007-250297 A | | 9/2007 | |
| WO | WO-03/012903 A1 | | 2/2003 | |
| WO | WO-2004/015805 A2 | | 2/2004 | |
| WO | WO-2004/015805 A3 | | 8/2004 | |

* cited by examiner

A

B

FUEL CELL

TECHNICAL FIELD

The present invention relates to a fuel cell.

This application claims priority to Japanese Patent Application No. 2015-142287 filed Jul. 16, 2015, and Japanese Patent Application No. 2016-016684 filed Jan. 29, 2016, and the entire contents of the Japanese applications are hereby incorporated by reference.

BACKGROUND ART

A fuel cell is a device that generates electrical power by the electrochemical reaction of fuel gas, such as hydrogen, and air (oxygen), and has high power generation efficiency because of the capacity to directly convert chemical energy to electricity. In particular, a solid oxide fuel cell (hereinafter referred to as SOFC) having an operation temperature of 1000° C. or lower has bright prospects due to its high reaction rate. In a SOFC, a membrane electrode assembly (MEA) in which an electrolyte layer containing a solid oxide and two electrodes formed of ceramic (sintered bodies) sandwiching the electrolyte layer are integrated is used. In other words, handling is easy since all of the constitutional elements of the MEA are solid.

Typically, in order to obtain high power, multiple MEAs are stacked and arranged. An interconnector (separator) that separates fuel gas and air from each other is disposed between the MEAs. A fuel cell needs gas channels adjacent to the MEAs in order to supply fuel gas or air to the MEAs.

In order to obtain gas channels, for example, in PTL 1, an expand metal is disposed between a MEA and an interconnector. Typically, a gas supply port for supplying fuel gas or air (hereinafter generally referred to as material gas) to the MEA and a gas discharge port for discharging unreacted material gas are formed in the interconnector. As in PTL 1, when an expand metal having a uniform porosity is used, the material gas tends to flow linearly from the gas supply port to the gas discharge port, and the gas diffusing property is poor.

In PTL 2, in order to enhance the material gas diffusing property and evenly supply the material gas to the MEAs, complicated dimples that form gas channels are formed on the interconnector by etching or the like.

CITATION LIST

Patent Literature

[PTL 1] Japanese Unexamined Patent Application Publication No. 2007-250297
[PTL 2] International Publication No. 2003/12903 pamphlet

SUMMARY OF INVENTION

One aspect of the present invention relates to a fuel cell that includes a MEA that includes a cathode, an anode, and a solid electrolyte layer disposed between the cathode and the anode, the solid electrolyte layer containing an ion-conducting solid oxide; at least one first porous metal body arranged to oppose at least one of the cathode and the anode; and an interconnector arranged to oppose the first porous metal body and having a gas supply port and a gas discharge port formed therein. The first porous metal body includes a porous metal body S that opposes the gas supply port and has a three-dimensional mesh-like skeleton, and a porous metal body H that has a three-dimensional mesh-like skeleton and is other than the porous metal body S. A porosity Ps of the porous metal body S and a porosity Ph of the porous metal body H satisfy a relationship: Ps<Ph.

DESCRIPTION OF EMBODIMENTS

Figure 1:
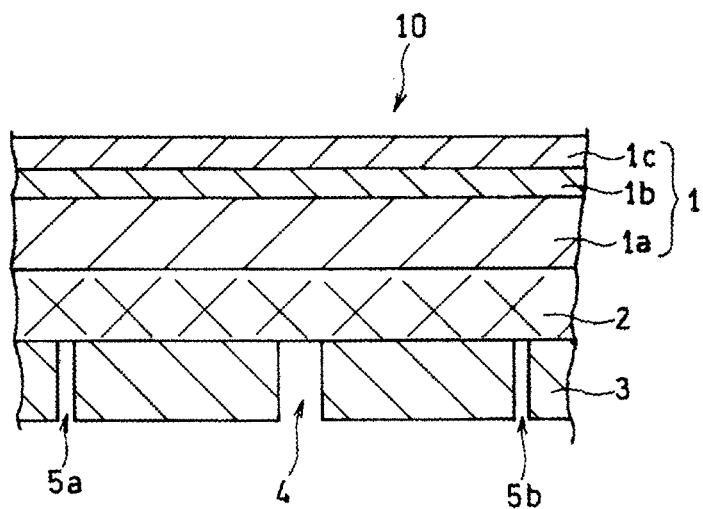
FIG. 1 is a schematic cross-sectional view of a structure of a related part of a fuel cell according to one embodiment of the present invention.

Problem to be Solved by Present Disclosure

The interconnector is required to have excellent heat resistance. Thus, typically, stainless steel having a high chromium content (chromium-based alloy) is used as the material for the interconnector. The chromium-based alloy is hard, and its workability is easily degraded. For example, as described in PTL 2, in order to form complicated gas channels by forming dimples on the interconnector, special facilities and conditions are necessary, which raises the cost and degrades production efficiency. A fuel cell is usually configured by stacking multiple (for example, 50 or more) constitutional units each including a MEA and an interconnector. Thus, the increase in process cost per sheet of the inter connector significantly increases the cost for the fuel cell.

Advantageous Effect of Present Disclosure

According to the present disclosure, a solid oxide fuel cell (SOFC) having an excellent gas diffusing property is obtained.

DESCRIPTION OF EMBODIMENTS OF INVENTION

First, the contents of the embodiments of the present invention are listed.

(1) A fuel cell according to the present invention includes a MEA that includes a cathode, an anode, and a solid electrolyte layer disposed between the cathode and the anode, the solid electrolyte layer containing an ion-conducting solid oxide; at least one first porous metal body arranged to oppose at least one of the cathode and the anode; and an interconnector arranged to oppose the first porous metal body and having a gas supply port and a gas discharge port formed therein. Here, the first porous metal body includes a porous metal body S that opposes the gas supply port and has a three-dimensional mesh-like skeleton, and a porous metal body H that has a three-dimensional mesh-like skeleton and is other than the porous metal body S, and a porosity Ps of the porous metal body S and a porosity Ph of the porous metal body H satisfy a relationship: Ps<Ph. In this manner, the gas diffusing performance is improved.

(2) The porous metal body S may oppose the gas discharge port and may have a shape of a strip that extends along a straight line that connects a center of the gas supply port and a center of the gas discharge port by a shortest distance. (3) The porous metal body S may have a shape of a circle or a polygon with a center corresponding to a center of the gas supply port. In this manner, the gas diffusing performance is further improved.

(4) The porosity Ps is preferably 85 vol % or more. This is because the gas diffusing property is further improved.

(5) The surface of the interconnector that opposes the first porous metal body is preferably smooth and flat. This is because the working cost for the interconnector is reduced.

(6) A second porous metal body stacked on the first porous metal body and having a three-dimensional mesh-like skeleton may be further provided. This is because further improvements in the gas diffusing property or improvements in the current collecting property can be expected.

(7) The first porous metal body and the second porous metal body are preferably bonded, and in the bonded portion, the skeleton of the first porous metal body and the skeleton of the second porous metal body are preferably entangled. This is because improvements in productivity can be expected.

(8) The second porous metal body is preferably disposed between the first porous metal body and the cathode or anode, and the pore size is preferably 100 to 1000 µm. In this manner, the current collecting property is further improved.

(9) The fuel cell according to the present invention preferably includes the first porous metal body that opposes at least the anode. This is because further improvements in power generation efficiency can be expected.

(10) The ratio of the porosity Ph to the porosity Ps is preferably 1.05 to 2 In this manner, the gas diffusing performance is improved.

(11) The porous metal body S preferably has a pore size of 100 to 1000 µm, and the porous metal body H preferably has a pore size of 300 to 3500 m. In this manner, the pressure loss can be decreased.

DETAILS OF EMBODIMENTS OF INVENTION

The embodiments of the present invention will now be specifically described. It should be understood that the present invention is not limited to the contents described below but by the claims, and is intended to include all modifications within the scope of the claims and equivalents thereof.

(Fuel Cell)

Figure 2:
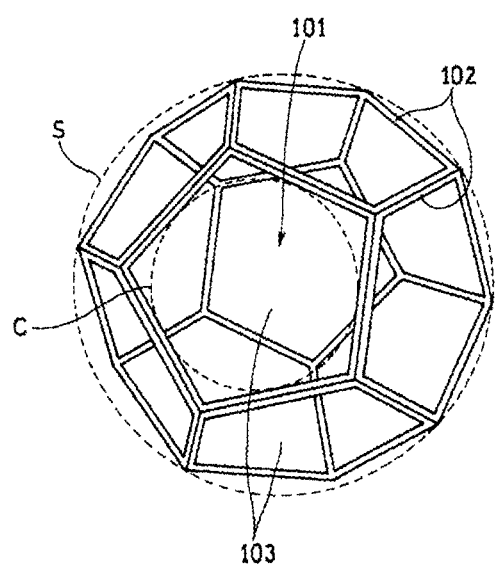
FIG. 2 is a schematic diagram of an example of a structure of a part of a skeleton of a porous metal body.
Figure 3:
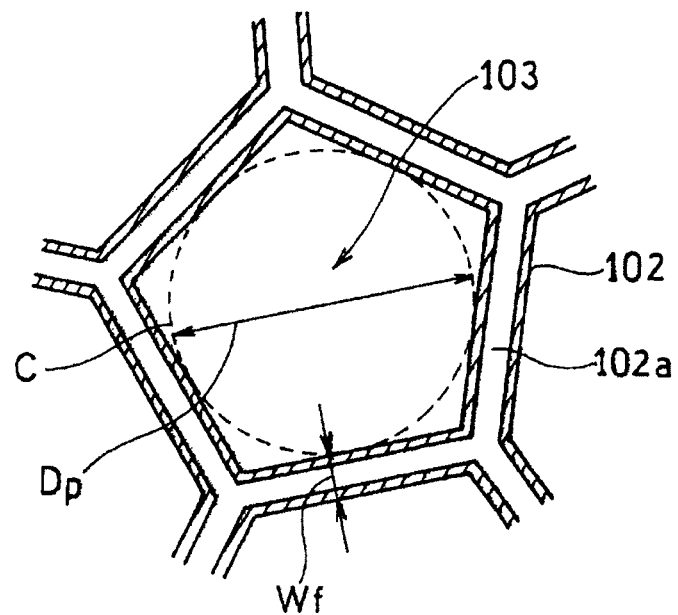
FIG. 3 is a schematic cross-sectional view of a part of the skeleton illustrated in FIG. 2.
Figure 4:
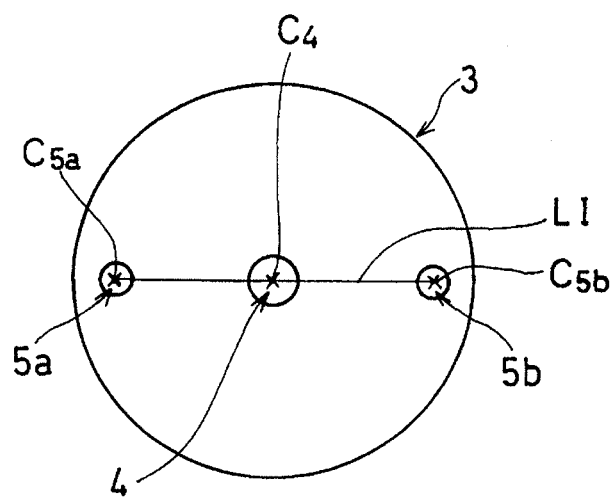
FIG. 4 is a schematic top view of an interconnector according to one embodiment of the present invention.
Figure 5A:
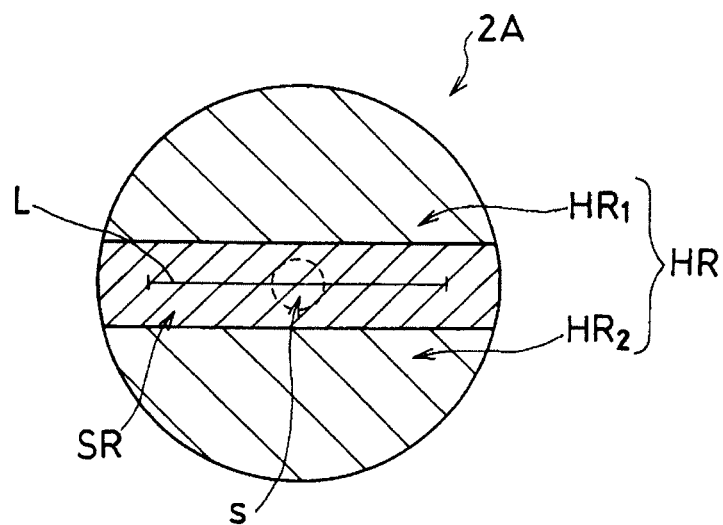
FIG. 5A is a schematic top view of a structure of a first porous metal body according to one embodiment of the present invention.
Figure 5B:
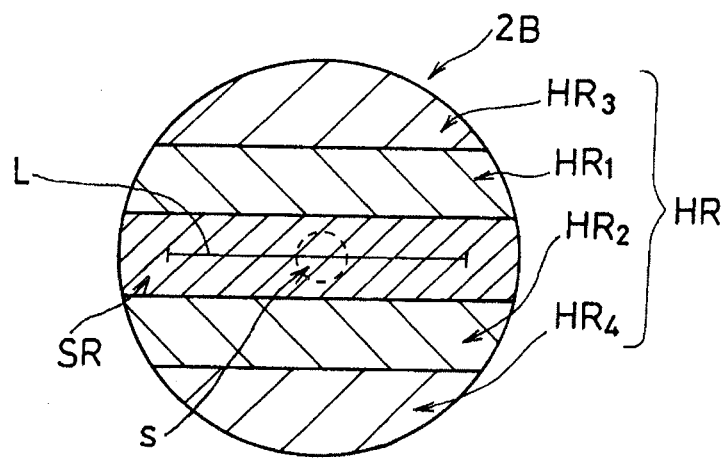
FIG. 5B is a schematic top view of a structure of a first porous metal body according to another embodiment of the present invention.

A fuel cell according to this embodiment will now be described with reference to FIGS. 1 to 4, 5A and 5B. FIG. 1 is a schematic cross-sectional view of one embodiment of a fuel cell. FIG. 2 is a schematic diagram illustrating an example of a structure of a portion of a skeleton of a porous metal body; and FIG. 3 is a schematic cross-sectional view of a portion of the skeleton. FIG. 4 is a schematic top view of an interconnector according to one embodiment. FIG. 5A and FIG. 5B are schematic top views of structures of a first porous metal body according to one embodiment. In the examples illustrated in the drawings, the MEA, the interconnector, and the first porous metal body are circular in shape; however, this is not limiting. A MEA 1, an interconnector 3, and a first porous metal body 2 may be for example, rectangular, elliptical, polygonal, or the like in shape.

As illustrated in FIG. 1, a fuel cell 10 includes the MEA 1. The MEA 1 includes a cathode 1c, an anode 1a, and a solid electrolyte layer that is disposed between the cathode 1c and the anode 1a and contains an ion-conducting solid oxide (hereinafter this layer is referred to as a solid electrolyte layer 1b). The first porous metal body 2 having a three-dimensional mesh-like skeleton is arranged to oppose the anode 1a. The interconnector 3 is arranged to oppose the first porous metal body 2.

A gas supply port 4 for supplying material gas (fuel gas or air) to the MEA 1 through the first porous metal body 2 and gas discharge ports 5a and 5b (hereinafter may be collectively referred to as a "gas discharge port") for discharging unreacted material gas are formed in the interconnector 3. In FIG. 4, the gas supply port 4 having a circular shape is disposed at the center portion of the interconnector 3, and the two gas discharge ports 5a and 5b both having a circular shape are arranged to lie in the outer peripheral portion of the interconnector 3 and on a straight line passing through the gas supply port 4. The numbers, shapes, and arrangements of the gas supply port 4 and the gas discharge port are not limited to those described above. The gas supply port 4 and the gas discharge port may have a rectangular shape. The gas supply port 4 may be disposed in the outer peripheral portion of the interconnector 3. In such a case, at least one gas discharge port may be disposed in the outer peripheral portion on the side opposite to the gas supply port 4 of the interconnector 3.

Although the first porous metal body 2 is arranged to oppose the anode 1a in FIG. 1, this is not limiting. The first porous metal body 2 may be arranged to oppose the cathode 1c; alternatively, two or more first porous metal bodies 2 may be arranged to oppose the anode 1a and the cathode 1c. In particular, the first porous metal body 2 is preferably arranged to oppose at least the anode 1a since the operating cost is reduced by the enhanced efficiency of using the fuel gas. The arrangement described above is preferable also from the viewpoint that since the anode 1a side is in a reducing atmosphere, no limit is imposed on the material for the porous metal body. In the description below, an example in which the first porous metal body 2 is arranged to oppose the anode 1a is described.

(Porous Metal Body)

The first porous metal body 2 (porous metal bodies S and H) and a second porous metal body 6 described below each have a three-dimensional mesh-like skeleton, for example, a structure resembling a non-woven fabric or a sponge. Such a structure has a void and a metal skeleton. For example, a porous metal body having a sponge-like structure is constituted by multiple cells each having a void and a metal skeleton.

One of the cells can be represented by, for example, a regular dodecahedron as illustrated in FIG. 2. A void 101 is defined by a fiber- or rod-like metal portion (fiber portion 102), and multiple metal portions are linked three-dimensionally. The skeleton of the cell is formed by fiber portions 102 that are connected to one another. A substantially pentagonal opening (or window) 103 surrounded by the fiber portions 102 is formed in the cell. Adjacent cells are in communication with each other by sharing one opening 103. In other words, the skeleton of the porous metal body is formed by the fiber portions 102 that form a mesh-like network while defining the voids 101 that are arranged continuously. A skeleton that has such a structure is referred to as a three-dimensional mesh-like skeleton.

As illustrated in FIG. 3, the fiber portion 102 may have a hollow space 102a inside, in other words, the fiber portion 102 may be hollow. The porous metal body that has a hollow skeleton is extremely light-weight despite having a bulky three-dimensional structure.

Such a porous metal body can be formed by coating a resin porous body having continuous pores with a metal, for example. Coating with metal can be performed by, for example, a plating method, a vapor phase method (vapor deposition, plasma chemical vapor deposition, sputtering, or the like), or application of a metal paste. A three-dimensional mesh-like skeleton is formed by the metal coating treatment. In particular, a plating method is preferably employed for metal coating.

The plating method may be any method that can form a metal layer on the surfaces (including the surfaces in the inside spaces) of the resin porous body, and a known plating method, for example, an electroplating method, a molten salt plating method, or the like, can be employed. A three-dimensional mesh-like porous metal body corresponding to the shape of the resin porous body is formed by the plating method. In other words, the pore size of the porous metal body obtained can be controlled by the pore size of the resin porous body. Meanwhile, in the case of a sintered body of metal powder, the type, particle diameter, blend ratio, etc., of the binder powder to be mixed affect the pore size. Thus, it is extremely difficult to control the pore size of the sintered bodies.

When a plating treatment is performed by the electroplating method, it is preferable to form a conductive layer before electroplating. The conductive layer may be formed by performing electroless plating, vapor deposition, or sputtering on the surface of the resin porous body, or by application of a conductive agent or immersing a resin porous body in a dispersion containing a conducting agent.

The resin porous body may be any body having continuous pores, and a resin foam, a resin non-woven fabric, or the like can be used. In particular, a resin foam is preferable since continuous pores can be easily formed in the porous metal body to be obtained. The resin constituting these porous bodies is preferably a resin that can be decomposed, dissolved, etc., after the metal coating treatment so that the inside of the metal three-dimensional mesh-like skeleton can be made hollow while maintaining the shape of the skeleton. Examples thereof include thermosetting resin such as thermosetting polyurethane and melamine resin; and thermoplastic resin such as olefin resin (polyethylene, polypropylene, etc.), and thermoplastic polyurethane. Among these, thermosetting polyurethane is preferably used from the viewpoint of ease of forming voids having more uniform size and shape.

The resin inside the skeleton is preferably removed by decomposition or dissolution by a heat treatment or the like. After the heat treatment, the components (the resin, decomposition products, unreacted monomers, additives contained in the resin, etc.) remaining inside the skeleton may be removed by washing or the like. The resin may be removed by performing a heat treatment while applying voltage as appropriate and as necessary. The heat treatment may be performed under application of voltage while a plated porous body is immersed in a molten salt plating bath.

When the resin inside is removed after the metal coating treatment as such, a hollow space is formed inside the skeleton of the porous metal body, and the skeleton becomes hollow. The porous metal body obtained as such has a skeleton having a three-dimensional mesh-like structure that corresponds to the shape of the resin foam. Commercially available porous metal bodies that can be used include "Aluminum CELMET" (registered trademark) and "CELMET" (registered trademark) formed of copper or nickel produced by Sumitomo Electric Industries, Ltd.

(First Porous Metal Body)

The first porous metal body 2 is disposed between the MEA 1 and the interconnector 3. The first porous metal body 2 has a role of diffusing and supplying, to the MEA 1, the material gas supplied from the gas supply port 4.

The first porous metal body 2 is configured by cutting at least two porous metal bodies with different porosities into desired shapes and combining them into the shape of the interconnector 3. The porous metal bodies are, for example, each sheet-shaped and each have a three-dimensional mesh-like skeleton and a uniform porosity. Since the porous metal body has a three-dimensional mesh-like skeleton, it is easily plastically deformable.

Thus, multiple porous metal bodies can be placed on the same plane without any space between. The multiple porous metal bodies constituting the first porous metal body 2 may be bonded to one another through entanglement of their skeletons. Bonding of the porous metal bodies (entanglement of the skeletons) is described below.

The first porous metal body 2 includes a porous metal body S arranged to oppose at least the gas supply port 4, and a porous metal body H that lies in the remaining portion. In other words, the porous metal body disposed in a portion s (refer to FIG. 5A) of the first porous metal body 2, the portion s opposing the gas supply port 4, is the porous metal body S, and a porous metal body other than the porous metal body S but constituting the first porous metal body 2 is the porous metal body H. The porosity Ps of the porous metal body S and the porosity Ph of the porous metal body H satisfy the relationship, Ps<Ph. In particular, the ratio of the porosity Ph relative to the porosity Ps (Ph/Ps) is preferably 1.05 to 2.

The material gas supplied to the first porous metal body 2 from the gas supply port 4 is prone to remain near the gas supply port 4. When the porosity of the porous metal body S at the portion s in the first porous metal body 2 opposing the gas supply port 4 is smaller than that of other portion, the material gas easily moves into the porous metal body H having high porosity and being remote from the gas supply port 4. Thus, the gas diffusing property is improved, and the gas utilization ratio is improved. As a result, the power generation efficiency is enhanced. In the description below, a region of the first porous metal body 2 occupied by the porous metal body S is referred to as a first region SR, and a region of the first porous metal body 2 occupied by the porous metal body H is referred to as a second region HR.

The shape of the first region SR viewed in a direction normal to the main surface of the first porous metal body 2 is not particularly limited. For example, as illustrated in FIG. 5A, the first region SR may oppose the gas discharge ports $5a$ and $5b$ as well as the gas supply port 4, and may have a shape of a strip that extends along a shortest straight line LI (refer to FIG. 4) that connects the center $C_4$ of the gas supply port 4 and the center $C_5$ ($C_{5a}$ and $C_{5b}$) of the gas discharge port 5 ($5a$ and $5b$). In this case, the shape of the second region HR ($HR_1$ and $HR_2$) viewed in a direction normal to the main surface of the first porous metal body 2 is constituted by, for example, two substantially semicircular shapes that oppose each other with the first region SR therebetween.

The material gas supplied to the first porous metal body 2 is prone to remain near the gas supply port 4 or move from the gas supply port 4 toward the gas discharge ports $5a$ and $5b$, in other words, the direction along the straight line LI. Thus, in particular, the material gas rarely diffuses to the portion of the first porous metal body 2 remote from the straight line L corresponding to the straight line LI. When the porosity of the first region SR including the straight line L (this porosity is equal to the porosity Ps of the porous metal body S; hereinafter, the porosity of the first region SR may be referred to as the porosity Ps) is smaller than the porosity of the second regions HR (this porosity is equal to the porosity Ph of the porous metal body H; hereinafter the porosity of the second region HR may be referred to as the porosity Ph), the material gas easily diffuses to the portion of the first porous metal body 2 remote from the straight line L.

Figure 6A:
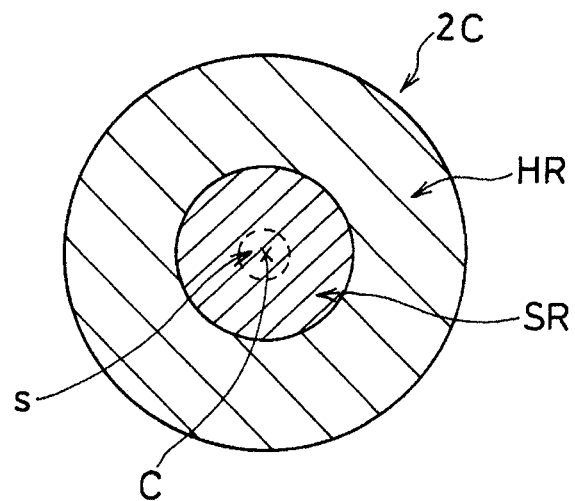
FIG. 6A is a schematic top view of a structure of a first porous metal body according to another embodiment of the present invention.

As illustrated in FIG. 6A, the first region SR viewed in a direction normal to the main surface of the first porous metal body 2 may have a shape of a circle having a center at point C corresponding to the center $C_4$ (refer to FIG. 4) of the gas supply port 4. In this manner, the material gas supplied from the gas supply port 4 to the first porous metal body 2 (2C) diffuses from the point C toward the second region HR having a larger porosity.

Figure 7A:
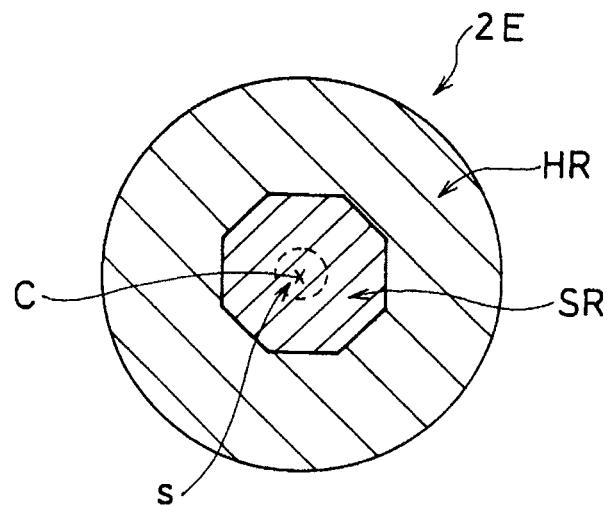
FIG. 7A is a schematic top view of a structure of a first porous metal body according to another embodiment of the present invention.

As illustrated in FIG. 7A, the first region SR viewed in a direction normal to the main surface of the first porous metal body 2 may have a shape of a polygon having a center at point C corresponding to the center $C_4$ of the gas supply port 4.

In this case also, as described above, the material gas supplied from the gas supply port 4 to the first porous metal body 2 diffuses from the point C toward the second region HR having a larger porosity. In FIG. 7A, the case in which the shape of the first region SR is a regular polygon (regular octagon) is illustrated; however, the shape of the first region SR may be any and can be, for example, triangular to dodecagonal. Moreover, as in the examples illustrated in the drawings, the shape may be a regular polygon that are equilateral, or may be a polygon with sides of different lengths.

Figure 6B:
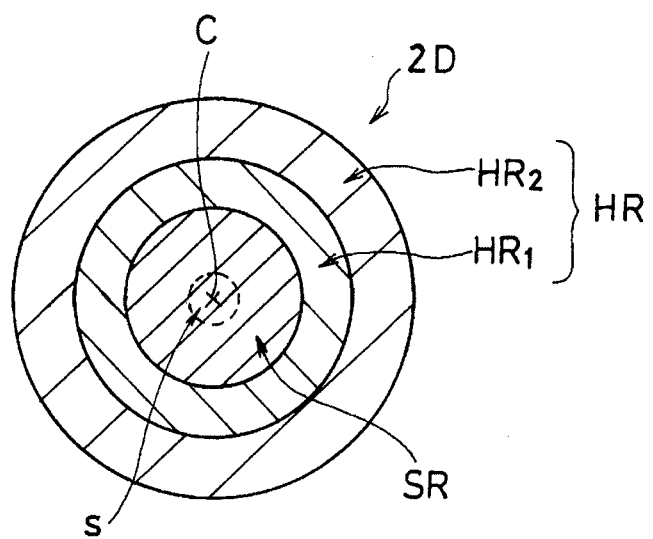
FIG. 6B is a schematic top view of a structure of a first porous metal body according to another embodiment of the present invention.
Figure 7B:
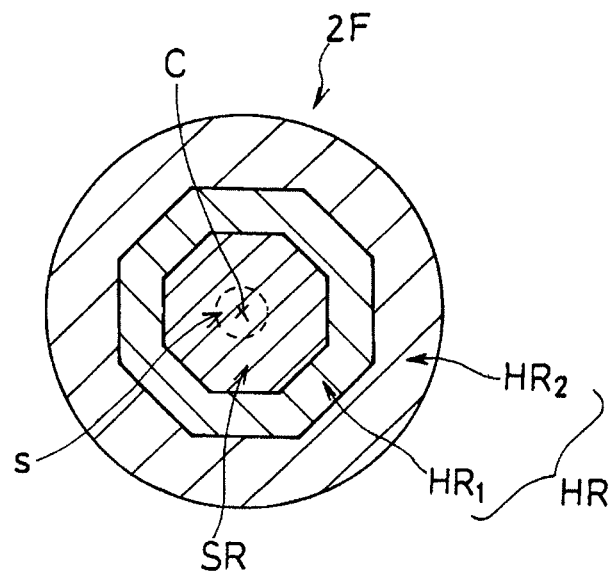
FIG. 7B is a schematic top view of a structure of a first porous metal body according to another embodiment of the present invention.

The second region HR may be constituted by multiple porous metal bodies. For example, as illustrated in FIG. 5B, the second region HR may be divided into strip-shaped divided regions $HR_1$ and $HR_2$ that are adjacent to the first region SR and parallel to the straight line L, and the rest of the second region HR may be divided into divided regions $HR_3$ and $HR_4$ that are respectively adjacent to the divided regions $HR_1$ and $HR_2$; and multiple porous metal bodies may be used to form the divided regions $HR_1$ to $HR_4$. For example, as illustrated in FIG. 6B, the second region HR may be divided into a divided region $HR_1$, which is a ring-shaped region surrounding a circular first region SR and being concentric with the first region SR, and a divided region $HR_2$, which is a ring-shaped region surrounding the divided region $HR_1$ and being concentric with the first region SR; and multiple porous metal bodies may be used to form the divided regions $HR_1$ and $HR_2$. Alternatively, as illustrated in FIG. 7B, the second region HR may be divided into a polygonal divided region $HR_1$, which surrounds a polygonal first region SR and has the same outer shape as the first region SR, and a divided region $HR_2$, which surrounds the divided region $HR_1$; and multiple porous metal bodies may be used to form the divided regions $HR_1$ and $HR_2$. Here, the porosities of the porous metal bodies that constitute the divided regions may be different from one another. The shapes of the divided regions are not limited to these.

In the case described above, the porosities of the porous metal bodies constituting the divided regions ($HR_1$ and the like) may be set so that the porosity Ps is smaller than the porosity Ph of the entire second region HR. For example, any one of the divided regions may be formed of a porous metal body having a smaller porosity than the first region SR. In other words, when the second region HR is formed of multiple porous metal bodies, the porosity Ph is determined by taking into account the porosities and volume ratios of the porous metal bodies. Specifically, the porosity Ph (vol %) is determined as follows: porosity (vol %) of divided region $HR_1 \times$volume ratio of second region HR occupied by divided region $HR_1$+ . . . +porosity of divided region $HR_n$ (vol %)×volume ratio of second region HR occupied by divided region $HR_n$. The porosity (vol %) of each divided region is determined as follows: {1−(apparent specific gravity of each divided region/true specific gravity of metal constituting the divided region)}×100.

In the case of the porous metal body 2B illustrated in FIG. 5B, from the viewpoint of the gas diffusing property, multiple porous metal bodies with different porosities are preferably placed in the divided regions so that the porosities of the divided regions become larger as the shortest distance from the straight line L becomes larger. Specifically, porous metal bodies with different porosities are placed in the divided regions so that the porosities $Ph_1$ and $Ph_3$ of the divided regions $HR_1$ and $HR_3$ satisfy the relationship, $Ph_1 < Ph_3$ and the porosities $Ph_2$ and $Ph_4$ of the divided regions $HR_2$ and $HR_4$ satisfy the relationship, $Ph_2 < Ph_4$. The porosities $Ph_1$ and $Ph_2$ or the porosities $Ph_3$ and $Ph_4$ may be the same or different from each other. The shapes of the divided regions $HR_1$ and $HR_3$ or the shapes of the divided regions $HR_2$ and $HR_4$ may be the same or different from each other.

Although FIG. 5B illustrates the case in which four porous metal bodies constitute the second region HR, this is not limiting. For example, three to seven porous metal bodies may be used to form the second region HR.

In this case, the porosities of the porous metal bodies may be the same or different from one another. The shapes of the porous metal bodies that constitute the second region HR is also not particularly limited. For example, as illustrated in FIGS. 5A and 5B, the porous metal bodies that constitute the second region HR may have strip shapes that are parallel to the first region SR (porous metal body S), or may have shapes (not illustrated) obtained by dividing the second region HR into multiple segments in directions perpendicular to the straight line L. The porous metal bodies that constitute the second region HR may have a shape obtained by combining the above-described shapes.

In the case of the porous metal bodies 2D and 2F illustrated in FIGS. 6B and 7B, from the viewpoint of the gas diffusing property, multiple porous metal bodies with different porosities are preferably placed in the divided regions so that the porosities of the divided regions $HR_1$ and $HR_2$ become larger as the shortest distance from the point C increases. Specifically, porous metal bodies with different porosities are arranged to form the divided regions so that the porosities $Ph_1$ and $Ph_2$ of the divided regions $HR_1$ and $HR2$ satisfy the relationship, $Ph_1 < Ph_2$.

The first region SR may be formed of multiple porous metal bodies. In other words, multiple porous metal bodies that include some parts of the portion s may be placed in the first region SR. In other words, any porous metal body that includes a portion of the portion s is the porous metal body S. When the first region SR includes multiple divided regions ($a_1$, . . . , $a_n$), the porosity Ps is determined by taking into account the porosities and the volume ratios of the divided regions ($a_1$, . . . , $a_n$). Specifically, the porosity Ps (vol %) is determined as follows: porosity (vol %) of divided region $a_1 \times$volume ratio of first region SR occupied by divided region $a_1$+ . . . +porosity of divided region $a_n$ (vol %)×volume ratio of first region SR occupied by divided region $a_n$.

Figure 8:
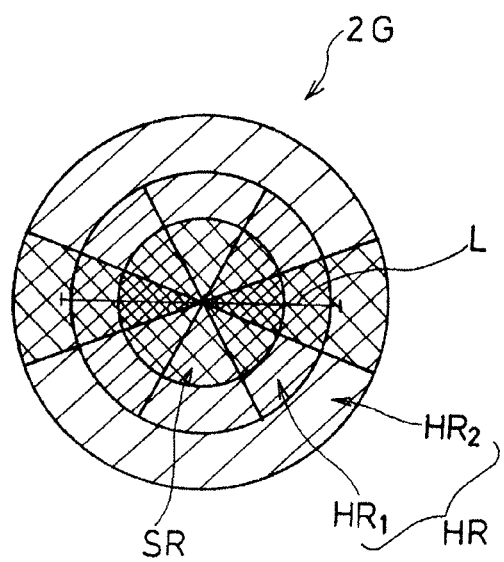
FIG. 8 includes schematic top views of a structure of a first porous metal body according to another embodiment of the present invention (A and B).
Figure 8:
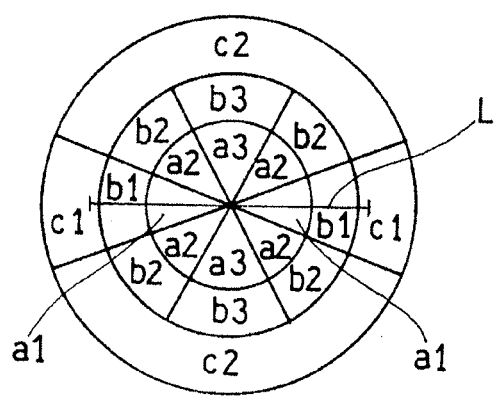

In the first porous metal body 2, multiple porous metal bodies with different porosities may be arranged so that the porosity of the region that includes the straight line L is small and the porosity increases from the point C toward the outer peripheral portion. This is because further improvements in the gas diffusing property can be expected. Specifically, for example, as illustrated in FIGS. 8A and 8B, when a first porous metal body 2G includes a circular first region SR with point C as the center and a second region HR that surrounds the first region SR, the first region SR is radially divided into eight equal parts. In other words, the porous metal body S is formed of fan-shaped porous metal bodies $a_1$ to $a_3$ having different porosities and the point C as the apex. Here, the porous metal bodies $a_1$ to $a_3$ each include a portion of the portion s. In FIG. 8, there are two porous metal bodies $a_1$, two porous metal bodies $a_2$, and two porous metal bodies $a_3$ disposed in the first region SR. In this case, in the first region SR, the porosity $Pa_1$ of the divided regions $a_1$ that include the straight line L is set to be smaller than the porosities ($Pa_2$ and $Pa_3$) of other divided regions $a_2$ and $a_3$ ($Pa_1 < Pa_2$ or $Pa_3$). Furthermore, the porosity of the divided regions $a_2$ adjacent to the divided regions a1 is preferably smaller than that of the divided region $a_3$ ($Pa_2 < Pa_3$).

Furthermore, the second region HR may be divided into divided regions $HR_1$ and $HR_2$. In this case, the porosities of the divided regions $HR_1$ and $HR_2$ may be set so that the porosity Ps of the entire first region SR is smaller than the porosity Ph of the entire second region HR ($HR_1$ and $HR_2$).

The divided regions may each be formed of multiple porous metal bodies with different porosities so as to further divide the divided regions $HR_1$ and $HR_2$ into multiple parts ($b_1$ to $b_3$ and $c_1$ and $c_2$). Here, the porous metal bodies are preferably arranged so that, in the divided regions $HR_1$ and $HR_2$ also, the porosities of the portions $b_1$ and $c_1$ that include the straight line L or an extended line thereof are smaller than those of other portions ($b_2$, $b_3$, and $c_2$). In FIG. 8, the divided region $HR_1$ is radially divided into eight equal parts, and the divided region $HR_2$ is divided into four parts. In the divided region $HR_1$, the porosity of the portion $b_2$ adjacent to the portion $b_1$ is preferably smaller than that of the portion $b_3$ ($Pb_2 < Pb_3$).

The magnitude relationship between the porosities of the divided regions $HR_1$ and $HR_2$ is not particularly limited. In particular, when a straight line is radially drawn with the point C at the center in the first porous metal body 2G, the relationship with which the porosity increases toward the outer peripheral portion from the point C on the straight line is preferable; in other words, porosity of divided region $HR_1$ < porosity of divided region $HR_2$ is preferably satisfied. In this manner, the gas more easily diffuses from the gas supply port 4 toward the outer peripheral portion.

Figure 9:
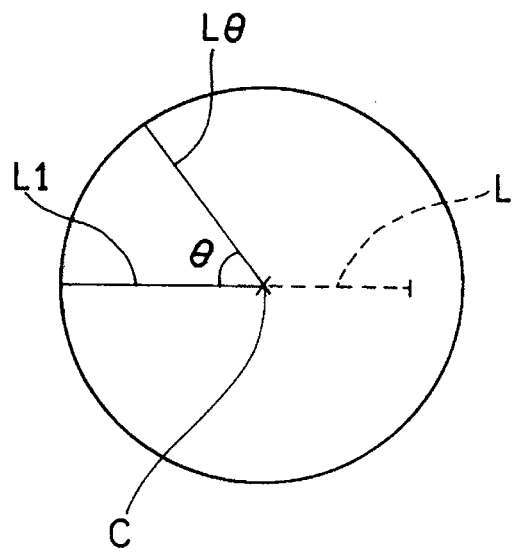
FIG. 9 is a schematic diagram illustrating straight lines L1 and $L_\theta$.

When the divided regions $HR_1$ and $HR_2$ are each to be further divided into multiple parts, the distribution of the porosity within the same divided region is not particularly limited. For example, as illustrated in FIG. 9, a straight line L1 that connects the point C and one of the points of intersection between the extended line of the straight line L and the outer rim of the first porous metal body 2 is drawn. When a straight line Lθ that forms an angle of θ (0°≤θ≤90°) with the straight line L1 is drawn, the porosity on the straight line Lθ preferably increases as the angle θ increases. In other words, when the straight line L1 and the straight line Lθ are orthogonal (0=900), the portion that includes the straight line Lθ has a larger porosity than other portions in the same region. In this manner, gas easily diffuses to the outer peripheral portion remote from the gas discharge port 5 (5a and 5b) also.

The ratio Rs at which the first region SR (porous metal body S) occupies the first porous metal body 2 is not particularly limited. In particular, from the viewpoint of the gas diffusing property, the ratio Rs is preferably 1 to 20 vol % and more preferably 20 to 50 vol %. The ratio Rs is obtained by dividing the sum (apparent volume of the porous metal body S) of the volumes of the skeleton portion (fiber portion 102) and the void 101 portion of the porous metal body S by the apparent volume of the first porous metal body 2, and multiplying the obtained result by 100.

The porosity Ps of the porous metal body S is not particularly limited. In particular, from the viewpoint of the gas diffusing property, the porosity Ps is preferably 70 vol % or more, more preferably 80 vol % or more, and yet more preferably 85 vol % or more. The porosity Ps is less than 100 vol %, preferably 98 vol % or less, more preferably 96 vol % or less, and yet more preferably 94 vol % or less. These lower limit values and the upper limit values can be combined as desired.

The porosity Ph of the porous metal body H may be any value larger than the porosity Ps. In particular, from the viewpoint of the gas diffusing property, the porosity Ph is preferably 85 vol % or more, more preferably 88 vol % or more, and yet more preferably 95 vol % or more. The porosity Ph is less than 100 vol %, may be 99.5 vol % or less, or may be 99 vol % or less. These lower limit values and the upper limit values can be combined as desired.

The pore size Ds of the porous metal body S is not particularly limited. The pore size Ds of the porous metal body S may be smaller than the pore size Dh of the porous metal body H. In particular, from the viewpoint of pressure loss, the pore size Ds is preferably 100 to 1000 μm and more preferably 100 to 500 μm. The pore size Dh of the porous metal body H is not particularly limited. In particular, from the viewpoint of pressure loss, the pore size Dh is preferably 100 to 5000 μm and more preferably 250 to 1700 μm.

The pore size Ds is, for example, determined as follows. First, one opening 103a is selected at random from the porous metal body S. The diameter Dp of a largest perfect circle C (refer to FIG. 2) to fit in the opening 103a, and the diameter of a smallest perfect circle that can contain the same opening 103a are measured, and the average thereof is determined. The result is assumed to be the pore size Da of the opening 103a. In the same manner, the pore sizes Db to Dj of any desired number (for example, nine) of other openings 103b to 103j of the porous metal body are determined, and the average of the pore sizes Da to Dj of the ten openings 103a to 103j is assumed to be the pore size Ds.

Specifically, in a SEM image of a main surface of the porous metal body S, a region R that includes 10 or more whole openings 103 is determined. Of the openings 103 included in the region R, for example, 10 openings are selected at random, and the pore sizes Da to Dj of the openings 103a to 103j are calculated by the method described above. The average of all of the pore sizes Da to Dj of the openings 103a to 103j calculated is assumed to be the pore size Ds.

When the porous metal body S is formed of multiple porous metal bodies, the pore size of each porous metal body is determined by the method described above, and the pore size of each porous metal body is multiplied by the volume ratio of the porous metal body S occupied by that porous metal body, and the sum of the resulting products is assumed to be the pore size Ds of the entire porous metal body S. The pore size Dh can also be determined in the same manner. As for the physical property values described below also, when the porous metal body S and/or the porous metal body H is formed of multiple porous metal bodies, the values can be determined by taking into account the volume ratio of each porous metal body.

The size (cell size) Vs of the void 101 in the porous metal body S is not particularly limited. In particular, from the viewpoint of pressure loss, the cell size Vs is preferably 100 to 1000 μm and more preferably 100 to 500 μm. The cell size Vh of the porous metal body H is not particularly limited. In particular, from the viewpoint of pressure loss, the cell size Vh is preferably 300 to 3500 μm and more preferably 500 to 3200 μm. The cell size Vs of the porous metal body S may be smaller than the cell size Vh of the porous metal body H.

The cell size Vs is, for example, determined as follows. First, one void 101a is selected at random from the voids 101 in the porous metal body S. The diameter of a largest sphere to fit in the void 101a and the diameter of a smallest sphere S (refer to FIG. 2) that can contain the void 101a are measured, and the average thereof is determined. The result is assumed to be the cell size Vsa of the void 101a. In the same manner, the cell sizes Vsb to Vsj of any desired number (for example, nine) of other openings 101b to 101j in the porous metal body S are determined, and the average of the cell sizes Vsa to Vsj of all ten openings 101a to 101j is assumed to be the cell size Vs.

Specifically, in a SEM image of a main surface of the porous metal body S, ten voids 101 that have clear outer rims are selected at random. The cell sizes Vsa to Vsj of these ten voids 101a to 101j are calculated by the method described above. The average of the cell sizes Vsa to Vsj of the voids 101a to 101j calculated is assumed to be the cell size Vs. The cell size Vh can also be determined in the same manner.

The metal constituting the first porous metal body 2 may be appropriately selected according to the service environment. For example, when the first porous metal body 2 is disposed to be adjacent to the anode 1a, the type of the metal is not particularly limited. Examples of the metal include copper (Cu), Cu alloys (alloys of copper with, for example, iron (Fe), nickel (Ni), silicon (Si), manganese (Mn), and the like), Ni or Ni alloys (alloys of Ni with, for example, tin (Sn), chromium (Cr), tungsten (W), and the like), aluminum (Al) or Al alloys (alloys of Al with, for example, Fe, Ni, Si, Mn, and the like), and stainless steel. When the first porous metal body 2 is disposed to be adjacent to the cathode 1c, the first porous metal body 2 is preferably formed of an alloy of Ni and a metal, such as Cr, that has high oxidation resistance. The metal constituting the porous metal body S and the metal constituting the porous metal body H may be the same or different.

The specific surface areas (BET specific surface areas) of the porous metal body S and the porous metal body H are also not particularly limited.

The specific surface areas may be, for example, 100 to 9000 $m^2/m^3$ each, or 200 to 6000 $m^2/m^3$ each. The specific surface area of the porous metal body S may be larger than the specific surface area of the porous metal body H.

The densities (cell densities) of the opening 103 in the porous metal body S and the porous metal body H are not particularly limited. In particular, from the viewpoint of the gas diffusing property, the cell density is preferably 5 to 100 cells/2.54 cm and more preferably 5 to 70 cells/2.54 cm each.

The cell density refers to the number of the opening 103 that lie on a straight line having a length of 1 inch (2.54 cm) drawn on the surface of the porous metal body. The cell density of the porous metal body S may be larger than the cell density of the porous metal body H.

The widths Wf of the skeletons (fiber portions 102) of the porous metal body S and the porous metal body H are also not particularly limited. For example, the width Wf may be 3 to 500 μm or 10 to 500 μm each. The width of the porous metal body S may be larger than the width of the porous metal body H.

The thicknesses of the porous metal body S and the porous metal body H are also not particularly limited. In particular, from the viewpoint of the gas diffusing property, the thickness T1 of the entire first porous metal body 2 is preferably 0.1 to 5 mm and more preferably 0.5 to 2 mm. The thickness T1 is, for example, an average value of the thicknesses at any ten points of the first porous metal body 2.

(Second Porous Metal Body)

The second porous metal body 6 having a three-dimensional mesh-like skeleton may be stacked on the first porous metal body 2. The porosity P2 of the second porous metal body 6 is not particularly limited and may be appropriately set according to the site to be placed, the purpose, etc. The second porous metal body 6 may also be formed by combining multiple porous metal bodies.

Figure 10A:
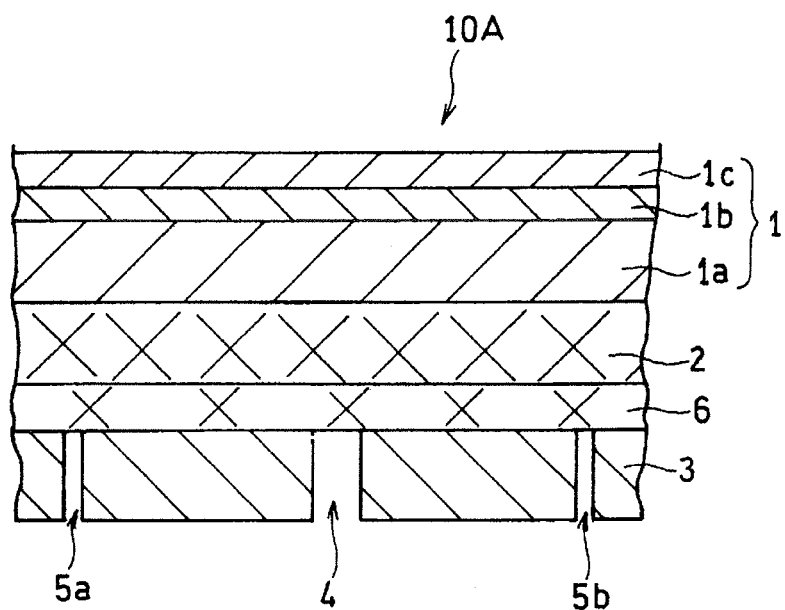
FIG. 10A is a schematic cross-sectional view of a fuel cell according to another embodiment of the present invention.

As illustrated in FIG. 10A, the second porous metal body 6 may be placed between the first porous metal body 2 and the interconnector 3. In this case, the porosity P2 of the second porous metal body 6 is preferably larger than porosity Ph of the second region HR. In this manner the pressure loss is decreased, and the gas diffusing property is further improved. The porosity P2 is determined as with the porosity Ps.

Figure 10B:
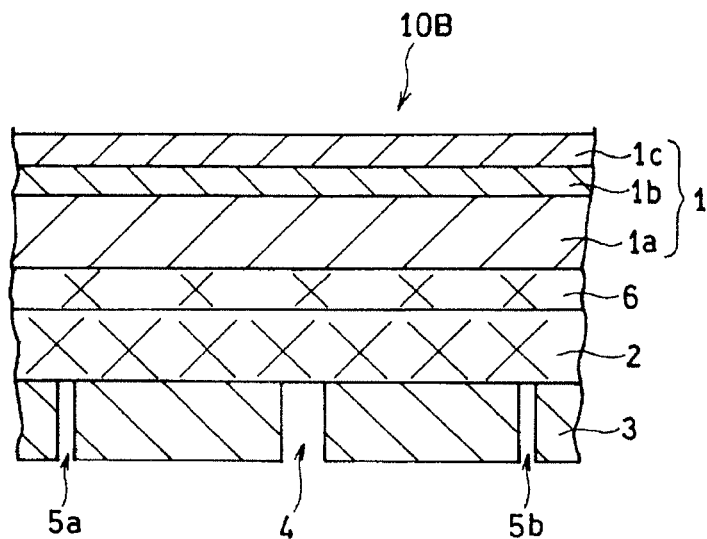
FIG. 10B is a schematic cross-sectional view of a fuel cell according to yet another embodiment of the present invention.

As illustrated in FIG. 10B, the second porous metal body 6 may be placed between the first porous metal body 2 and any one of the electrodes of the MEA 1 (in FIG. 10B, the anode 1a). The porosity P2 of the second porous metal body 6 is not particularly limited. The pore size D2 of the second porous metal body 6 is preferably smaller than the pore size D1 of the entire first porous metal body 2 (porous metal body S and porous metal body H) and more preferably not more than the pore size Ds of the porous metal body S from the viewpoint of the current collecting property.

When the pore size is small, the irregularities on the surface are small. Thus, the smaller the pore size D2 of the second porous metal body 6, the more easily the contacting property to the electrode (anode 1a) is improved. Thus, the resistance is decreased. In particular, from the viewpoint of the balance between electrical resistance and the gas diffusing property, the ratio (D1/D2) of the pore size D1 of the entire first porous metal body 2 to the pore size D2 of the second porous metal body 6 is preferably 1.2 to 10 and more preferably 1.5 to 5. The pore size D2 is determined as with the pore size Ds.

The cell size, cell density, BET specific surface area, and width Wf of the skeleton 102 of the second porous metal body 6 are not particularly limited and may be appropriately set according to the site to be placed, the purpose, etc. Examples of the numerical ranges are the same numerical ranges as those described as examples regarding the porous metal body S and the porous metal body H.

The thickness T2 of the second porous metal body 6 is also not particularly limited. In particular, from the viewpoints of the resistance and the gas diffusing property, the thickness T2 is preferably 0.1 to 5 mm and more preferably 0.5 to 2 mm. From the same viewpoints, the ratio (T1/T2) of the thickness T1 of the first porous metal body 2 to the thickness T2 of the second porous metal body 6 is preferably 1 to 10 and more preferably 1 to 5.

The metal constituting the second porous metal body 6 may be appropriately selected according to the service environment. The metal constituting the first porous metal body 2 and the metal constituting the second porous metal body 6 may be the same or different. Examples of the metal include the same metals as those described as examples for the first porous metal body 2.

From the viewpoints of the current collecting property, the gas diffusing property, and the productivity, the first porous metal body 2 and the second porous metal body 6 are preferably bonded by entanglement of the skeletons thereof. Similarly, the porous metal body S and the porous metal body H are also preferably bonded by entanglement of the skeletons thereof. Entanglement of the skeletons can be, for example, a state in which a portion near an end of the fiber portion 102 of the second porous metal body 6 (or the porous metal body H) is inserted into the opening 103 present near a portion near an end of the first porous metal body 2 (or porous metal body S). Alternatively, it can be a state in which the fiber portions 102 that are present near the ends of the porous metal bodies are plastically deformed and engaged. In this manner, the first porous metal body 2 and the second porous metal body 6 (or the porous metal body S and the porous metal body H) are strongly bonded to each other near the main surfaces thereof without requiring an adhesive therebetween. Thus, the first porous metal body 2 and the second porous metal body 6 (or the porous metal body S and the porous metal body H) become electrically coupled and become communicated with each other.

For example, a composite material in which the first porous metal body 2 and the second porous metal body 6 are bonded can be obtained by stacking a precursor (first precursor) of the first porous metal body 2 and a precursor (second precursor) of the second porous metal body 6, and press-forming the resulting stack. The porosity, the pore size, and the cell size of each precursor can decrease by 2 to 10%, respectively, due to the press forming. Thus, the porosity, the pore size, and the cell size of each precursor are appropriately set so that the porosity, the pore size and the cell size of each of the first porous metal body 2 and the second porous metal body 6 after press forming are within the desired ranges. The porosity, the pore size, and the cell size of the precursor can be determined as with the porosity, the pore size, and the cell size of the first porous metal body 2.

The method for press forming is not particularly limited, and may be, for example, roll pressing, flat pressing, or the like. The press forming may be performed under heating. In particular, from the viewpoints of cost and production efficiency, the first precursor and the second precursor are preferably bonded by roll pressing at room temperature. The pressing pressure is not particularly limited and may be set as appropriate. The pressing pressure may be, for example, 0.1 to 5 MPa or may be 1 to 5 MPa.

(MEA)

MEA 1 includes the cathode 1c, the anode 1a, and a solid electrolyte layer 1b interposed between the cathode 1c and the anode 1a and having ion conductivity. The cathode 1c, the anode 1a, and the solid electrolyte layer 1b are integrated by sintering, for example.

(Cathode)

The cathode 1c has a porous structure capable of adsorbing oxygen molecules and ionizing them. Examples of the material for the cathode 1c include known materials used in the cathodes of fuel cells, gas decomposition devices, and hydrogen production apparatuses. The material for the cathode 1c is, for example, a compound containing lanthanum and having a perovskite structure. Specific examples thereof include lanthanum strontium cobalt ferrite (LSCF, $La_{1-a}Sr_aFe_{1-b}Co_bO_{3-\delta}$, $0.2 \leq a \leq 0.8$, $0.1 \leq b \leq 0.9$, where $\delta$ represents an oxygen vacancy concentration), lanthanum strontium manganite (LSM, $La_{1-c}Sr_cMnO_{3-\delta}$, $0.2 \leq c \leq 0.8$, where $\delta$ represents an oxygen vacancy concentration), and lanthanum strontium cobaltite (LSC, $La_{1-HR}Sr_{HR}CoO_{3-\delta}$, $0.2 \leq HR \leq 0.8$, where $\delta$ represents an oxygen vacancy concentration).

The cathode 1c may contain a catalyst such as nickel, iron, or cobalt. When a catalyst is contained, the cathode 1c can be formed by mixing the above-described material with a catalyst, and sintering the resulting mixture. The thickness of the cathode 1c is not particularly limited and may be about 5 µm to 100 µm.

(Anode)

The anode 1a has an ion-conducting porous structure. For example, in the protonically conductive anode 1a, a reaction (oxidation reaction of a fuel) of oxidizing a fuel, such as hydrogen, introduced from the channel described below so as to release hydrogen ions (protons) and electrons is performed.

Examples of the material for the anode 1a include known materials used in the anodes of fuel cells, gas decomposition devices, and hydrogen production apparatuses. Specific examples thereof include composite oxides between nickel oxide (NiO), which is a catalyst component, and a solid oxide, such as yttrium oxide ($Y_2O_3$), yttria-stabilized zirconia (YSZ, $ZrO_2$—$Y_2O_3$), yttrium-doped barium zirconate (BZY, $BaZr_{1-e}Y_eO_{3-\delta}$, $0.05 \leq e \leq 0.25$ where $\delta$ represents an oxygen vacancy concentration), yttrium-doped barium cerate (BCY, $BaCe_{1-f}Y_fO_{3-\delta}$, $0.05 \leq f \leq 0.25$, where $\delta$ represents an oxygen vacancy concentration), a mixed oxide of yttrium-doped barium zirconate and barium cerate (BZCY, $BaZr_{1-g-h}Ce_gY_hO_{3-\delta}$, $0 \leq g \leq 1$, $0.05 \leq h \leq 0.25$, where $\delta$ represents an oxygen vacancy concentration). The anode 1a that contains such a composite oxide can be formed by, for example, mixing NiO powder and powder of the above-described solid oxide or the like, and sintering the resulting mixture.

The thickness of the anode 1a may be, for example, about 10 µm to 1000 µm. The anode 1a may have a large thickness so as to function as a support of the MEA 1. FIG. 1 illustrates the case in which the thickness of the anode 1a is made larger than that of the cathode 1c so that the anode 1a functions as a support of the MEA 1. The thickness of the anode 1a is not limited to this, and may be, for example, the same as the thickness of the cathode 1c.

(Solid Electrolyte Layer)

The solid electrolyte layer 1b contains an ion-conducting solid oxide. The ions moving in the solid electrolyte layer 1b are not particularly limited, and may be oxide ions or protons. In particular, the solid electrolyte layer 1b preferably has a proton conductivity. Protonic ceramic fuel cells (PCFCs) can operate at an intermediate temperature zone of 400 to 600° C., for example. Thus, PCFCs can be used in a wide variety of usages.

Examples of the material for the solid electrolyte layer 1b are the same as the solid oxides described as the examples of the material for the anode 1a, for example. The thickness of the solid electrolyte layer 1b is not particularly limited but is preferably about 5 µm to 100 µm since the resistance can be suppressed low.

(Method for Producing MEA)

A method for producing the MEA 1 is not particularly limited, and any known method can be used. For example, a method that includes a step of press-forming an anode material, a step of stacking a solid-oxide-containing solid electrolyte material on one side of the resulting anode formed body and sintering the resulting stack, and a step of stacking a cathode material on a surface of the sintered solid electrolyte material and sintering the resulting stack can be employed. In the MEA 1 produced as such, the anode 1a, the solid electrolyte layer 1b, and the cathode 1c are integrated.

The step of stacking the solid electrolyte material is performed by applying, to one side of an anode formed body, a paste obtained by mixing powder of a solid electrolyte material and a water-soluble binder resin by screen-printing, spray-coating, spin-coating, dip-coating or the like. The cathode material can be stacked on the surface of the solid electrolyte in the same manner.

Sintering of the solid electrolyte material is performed by heating a stack, which includes the anode formed body and the solid electrolyte material, in an oxygen atmosphere to, for example, 1300 to 1500° C. The oxygen content in the sintering atmosphere is not particularly limited and may be 50 vol % or more or 60 vol % or more. The heating temperature is preferably 1350 to 1450° C. Sintering can be performed under a normal pressure or an increased pressure.

Prior to stacking the solid electrolyte material, the anode material may be calcined. Calcining may be performed at a temperate (for example, 900 to 1100° C.) lower than the temperature for sintering the anode material. Calcining facilitates stacking of the solid electrolyte material.

Prior to sintering the solid electrolyte material, resin components such as a binder contained in each material may be removed. In other words, after the cathode material is stacked, heating to a relatively low temperature of 500 to 800° C. is performed in air so as to remove the resin components contained in the materials. Subsequently, the stack may be heated to 1300 to 1500° C. in an oxygen atmosphere to sinter the materials.

Sintering of the cathode material is performed by sintering a stack, which includes the cathode material and the anode formed body with the solid electrolyte layer thereon, in an oxygen atmosphere at 800 to 1100° C., for example. The oxygen content in the sintering atmosphere is not particularly limited, and may be, for example, within the above-described range.

Sintering can be performed under a normal pressure or an increased pressure.

(Interconnector)

The interconnector 3 separates fuel gas and air from each other. The MEA 1, the porous metal body 2, and the interconnector 3 are combined to form one structure unit. When the fuel cell 10 includes two or more such structure units that are stacked, one surface of the interconnector 3 may be arranged to contact the first porous metal body 2 and the other surface may be arranged to contact one surface of the MEA 1.

Examples of the material for the interconnector 3 include, from the viewpoints of conductivity and heat resistance, heat resistant alloys such as stainless steels, nickel-based alloys, and chromium-based alloys. In the case of the PCFC which has an operation temperature of about 400 to 600° C., inexpensive stainless steel can be used as the material for the interconnector.

Since the first porous metal body 2 has an excellent gas diffusing property, there is no need to form a gas channel in the surface of the interconnector 3 adjacent to the first porous metal body 2, the surface opposing the first porous metal body 2; and this surface may be smooth and flat. Smooth and flat means that the surface does not have irregularities sufficient to function as a gas channel.

As a result, even when a chromium-based alloy, which has low workability, is used in the interconnector 3, the interconnector can function as the interconnector without requiring etching. Thus, the productivity is improved, and the cost is reduced. Note that when the fuel cell 10 includes stacked structure units, a gas channel may be formed in a surface (the surface in contact with the MEA 1) of the interconnector 3 not in contact with the first porous metal body 2.

The porous metal body that has a three-dimensional mesh-like skeleton described above is suitable not only for use in fuel cells but also for use in producing hydrogen by electric decomposition (electrolysis) of water. The hydrogen production methods are roughly categorized into (1) an alkaline water electrolysis method that uses an alkaline aqueous solution, (2) a polymer electrolyte membrane (PEM) method, and (3) a solid oxide electrolysis cell (SOEC) method; and the porous metal body described above can be used in any of these methods. Examples of such a porous metal body include the porous metal body S, the porous metal body H, other porous metal bodies that have three-dimensional mesh-like skeletons, and any combination of the foregoing (the same applies hereinafter).

(1) The alkaline water electrolysis method involves immersing an anode and a cathode in an alkaline aqueous solution (preferably a strong alkaline aqueous solution) and applying voltage between the anode and the cathode to electrolyze water. In this case, the porous metal body is used in at least one of the electrodes. At the anode, hydroxyl ions are oxidized, and oxygen and water are generated. At the cathode, hydrogen ions are reduced, and hydrogen is generated. Since the porous metal body has a large surface area, the contact area between the ions and the porous metal body is large, and the water electrolysis efficiency is improved. Moreover, since the porous metal body has excellent electrical conductivity, the water electrolysis efficiency is further improved. In addition, since the porous metal body has high porosity, hydrogen and oxygen generated can rapidly desorb. The improvement in the water electrolysis efficiency can be expected from this point also.

The metal that constitutes the porous metal body is not particularly limited, and examples of the metal include those metals described as the examples of the metal that constitutes the porous metal body S or the porous metal body H. In particular, the porous metal body to be used as the cathode preferably contains Ni or an Ni alloy, which is low-cost and has excellent catalytic ability for the hydrogen generation reaction. The porous metal body to be used as the anode preferably contains platinum from the viewpoint of catalytic activity.

The pore size of the porous metal body is preferably 100 µm or more and 5000 µm or less. As long as the pore size of the porous metal body is within this range, hydrogen or oxygen generated at each electrode can rapidly desorb, thereby further improving the electrolysis efficiency and ensuring a sufficient contact area between each electrode and hydrogen ions or hydroxyl ions. The pore size of the porous metal body is preferably 400 µm or more and 4000 µm or less from the same viewpoint. Considering the desorption of bubbles, water retention, and electrical connection, multiple porous metal bodies with different porosities (for example, the porous metal body S and the porous metal body H) may be combined to form one electrode. In such a case, the porous metal bodies that are stacked are preferably bonded with one another by entanglement of their skeletons at the interfaces. The porous metal body may be used in combination with another porous metal body.

The thickness and the mass per unit area (metal content) of the porous metal body may be appropriately set according to the scale of the production apparatus. For example, the thickness, the mass per unit area, etc., may be set according to the area of the main surface of each electrode so that warping and the like do not occur.

In order to prevent generated hydrogen and oxygen from becoming mixed with each other, a separator is preferably disposed between the anode and the cathode. The material for the separator may be any material that has wettability, ion permeability, alkali resistance, a non-conducive property, air impermeability, thermal stability, etc. Examples of the material for such a separator include fluororesins impregnated with potassium titanate, polyantimonic acid, polysulfone, hydrophilized polyphenylene sulfide, polyvinylidene fluoride, and polytetrafluoroethylene. When multiple structure units each including an anode, a cathode, and a separator are stacked and used, a separator such as one described above is preferably placed between the structure units from the viewpoint of preventing short-circuiting.

The solute of the alkaline aqueous solution is not particularly limited, and examples thereof include hydroxides of alkali metals (lithium, sodium, potassium, rubidium, cesium, and francium) and alkaline earth metals (calcium, strontium, barium, and radium). Among these, hydroxides of alkali metals (in particular, NaOH and KOH) are preferable since a strong alkaline aqueous solution is obtained. The concentration of the alkaline aqueous solution is not particularly limited, and may be 20 to 40 mass % from the viewpoint of the electrolysis efficiency. The operation temperature is, for example, about 60 to 90° C., and the current density is, for example, about 0.1 to 0.3 A/cm$^2$.

(2) The PEM method involves electrolyzing water by using a polymer electrolyte membrane. Specifically, according to the PEM method, an anode and a cathode are respectively placed on two surfaces of a polymer electrolyte membrane, and water is introduced to the anode while applying voltage between the anode and the cathode so as to electrolyze the water. In this case, the porous metal body is used at least in the anode. Since the anode side and the cathode side are completely separated from each other by the polymer electrolyte membrane according to the PEM method, there is an advantage in that hydrogen can be extracted at high purity compared to the alkaline water electrolysis method (1). Moreover, the porous metal body has a large surface area and excellent electrical conductivity. Thus, the porous metal body is suitable for use in an anode of a hydrogen production apparatus (PEM hydrogen production apparatus) that employs the PEM method.

Protons generated from the PEM hydrogen production apparatus pass through the polymer electrolyte membrane, move to the cathode, and are extracted as hydrogen at the cathode side. In other words, the PEM hydrogen production apparatus utilizes a completely reverse reaction from the solid polymer fuel cell, in which power is generated by reacting hydrogen and oxygen and water is discharged, but has a similar structure. The operation temperature of the PEM hydrogen production apparatus is about 100° C. Examples of the polymer electrolyte membrane that can be used include protonically conductive polymers, such as perfluorosulfonic acid polymer, that are used in solid polymer fuel cells or PEM hydrogen production apparatuses of the related art. The cathode also preferably contains the porous metal body since hydrogen generated can rapidly desorb.

The metal that constitutes the porous metal body is not particularly limited, and examples of the metal include those metals described as the examples of the metal that constitutes the porous metal body S or the porous metal body H. In particular, the porous metal body to be used as the anode preferably contains Ni or an Ni alloy, which is low-cost and has excellent catalytic ability for the hydrogen generation reaction. The porous metal body to be used as the cathode preferably contains rhodium from the viewpoint of catalytic activity.

The pore size of the porous metal body is preferably 100 μm or more and 5000 μm or less. When the pore size of the porous metal body is within this range, hydrogen or oxygen generated at each electrode can rapidly desorb, and thus the electrolysis efficiency is further improved and the water retention is enhanced. In particular, when the anode has poor water retention, water passes through the anode before it sufficiently reacts with the anode; thus, the electrolysis efficiency is easily degraded. The pore size of the porous metal body is preferably 400 μm or more and 4000 μm or less from the same viewpoint. Considering the desorption of bubbles, water retention, and electrical connection, multiple porous metal bodies with different porosities may be stacked to form one electrode. In particular, the anode is preferably formed by combining the porous metal body S and the porous metal body H. In this case, the porous metal body S is arranged to oppose the water supply port. In this manner, the water electrolysis efficiency is further improved. The porous metal bodies that are combined are preferably bonded with one another by entanglement of their skeletons at the interfaces. The porous metal body may be used in combination with another porous metal body.

The thickness and the mass per unit area of the porous metal body may be appropriately set according to the scale of the production apparatus. In particular, the thickness and the mass per unit area are preferably adjusted so that the porosity of the porous metal body is 30% or more. This is because when the porosity of the porous metal body is smaller than 30%, the pressure loss that occurs when water flows inside the porous metal body is increased.

According to this method, the polymer electrolyte membrane and the porous metal bodies used as the electrodes become in communication with one another by pressure bonding. Thus, the masses of the porous metal bodies per unit area are preferably adjusted so that the deformation of the electrodes during pressure bonding and the increase in electrical resistance due to creeping are within the range that does not cause practical problem. The mass per unit area of the porous metal body is preferably 400 g/m$^2$ or more.

(3) The SOEC method (also called a steam electrolysis method) is a method of electrolyzing steam by using a solid oxide electrolyte membrane. Specifically, according to the SOEC method, an anode and a cathode are respectively placed on two surfaces of a solid oxide electrolyte membrane, and steam is introduced to one of the electrodes while applying voltage between the anode and the cathode so as to electrolyze the steam.

According to the SOEC method, to which electrode steam is introduced depends on whether the solid oxide electrolyte membrane is protonically conductive or oxide ion conductive. When the solid oxide electrolyte membrane is oxide ion conductive, steam is introduced to the cathode. Steam is electrolyzed at the cathode, and protons and oxide ions are generated. The generated protons are reduced at the cathode and extracted as hydrogen. The oxide ions pass through the solid oxide electrolyte membrane, move to the anode, become oxidized at the anode, and are extracted as oxygen. When the solid oxide electrolyte membrane is protonically conductive, steam is introduced to the anode. Steam is electrolyzed at the anode, and protons and oxide ions are generated. The generated protons pass through the solid oxide electrolyte membrane, move to the cathode, become reduced at the cathode, and are extracted as hydrogen. The oxide ions are reduced at the anode and extracted as oxygen.

In the SOEC method, the porous metal body described above is used as the electrode to which steam is introduced. Since the porous metal body has a large surface area, the contact area between the steam and the electrode is large, and the steam electrolysis efficiency is improved. Moreover, since the porous metal body has excellent electrical conductivity, the steam electrolysis efficiency is further improved.

The solid oxide electrolyte membrane is preferably protonically conductive from the viewpoint of ease of obtaining hydrogen at high purity. This is because when the solid oxide electrolyte membrane is protonically conductive, the electrode to which steam is introduced is different from the electrode from which hydrogen is extracted. In such a case, the porous metal body is used as the anode. The cathode also preferably contains the porous metal body since hydrogen generated can rapidly desorb.

In other words, the hydrogen production apparatus that employs the SOEC method (SOEC hydrogen production apparatus) utilizes a completely reverse reaction from the solid oxide fuel cell, in which power is generated by reacting hydrogen and oxygen and water is discharged, but has a similar structure. The operation temperature of the SOEC hydrogen production apparatus is about 600° C. to 800° C., and oxygen is generated at the anode. Thus, the anode is put in a high-temperature oxidizing atmosphere. Since the porous metal body has high oxidization resistance and heat resistance, the porous metal body is suitable for use as the anode, in particular, of the SOEC hydrogen production apparatus.

The metal that constitutes the porous metal body is not particularly limited, and examples of the metal include those metals described as the examples of the metal that constitutes the porous metal body S or the porous metal body H. In particular, the porous metal body that contains an Ni alloy containing 3 to 30 mass % of a metal, such as Cr, having high oxidization resistance is preferably used in the anode put in an oxidizing atmosphere. The porous metal body to be used as the cathode preferably contains Sn from the viewpoint of electrical resistance.

The pore size of the porous metal body is preferably 100 μm or more and 5000 μm or less. As long as the pore size of the porous metal body is within the above-described range, the pressure loss of steam falls within an appropriate range, and electrolysis efficiency is enhanced. When the porous metal body is used in the cathode, generated hydrogen also can rapidly desorb. The pore size of the porous metal body is preferably 400 μm or more and 4000 μm or less from the same viewpoint. Considering the desorption of bubbles, water retention, and electrical connection, multiple porous metal bodies with different pore sizes may be stacked to form one electrode. In particular, the electrode to which steam is introduced is preferably formed by combining the porous metal body S and the porous metal body H. In this case, the porous metal body S is arranged to oppose the steam supply port. In this manner, the steam electrolysis efficiency is further improved. The porous metal bodies that are stacked are preferably bonded with one another by entanglement of their skeletons at the interfaces. The porous metal body may be used in combination with another porous metal body.

The thickness and the mass per unit area of the porous metal body may be appropriately set according to the scale of the hydrogen production apparatus. In particular, the thickness and the mass per unit area are preferably adjusted so that the porosity of the porous metal body is 30% or more. This is because when the porosity of the porous metal body is smaller than 30%, the pressure loss that occurs when steam flows inside the porous metal body is increased. According to this method, the solid oxide electrolyte membrane and the porous metal bodies used as the electrodes become in communication with one another by pressure bonding. Thus, the masses of the porous metal bodies per unit area are preferably adjusted so that the deformation of the electrodes during pressure bonding and the increase in electrical resistance due to creeping are within the range that does not cause practical problem. The mass per unit area of the porous metal body is preferably 400 g/m$^2$ or more.

Figure 11:
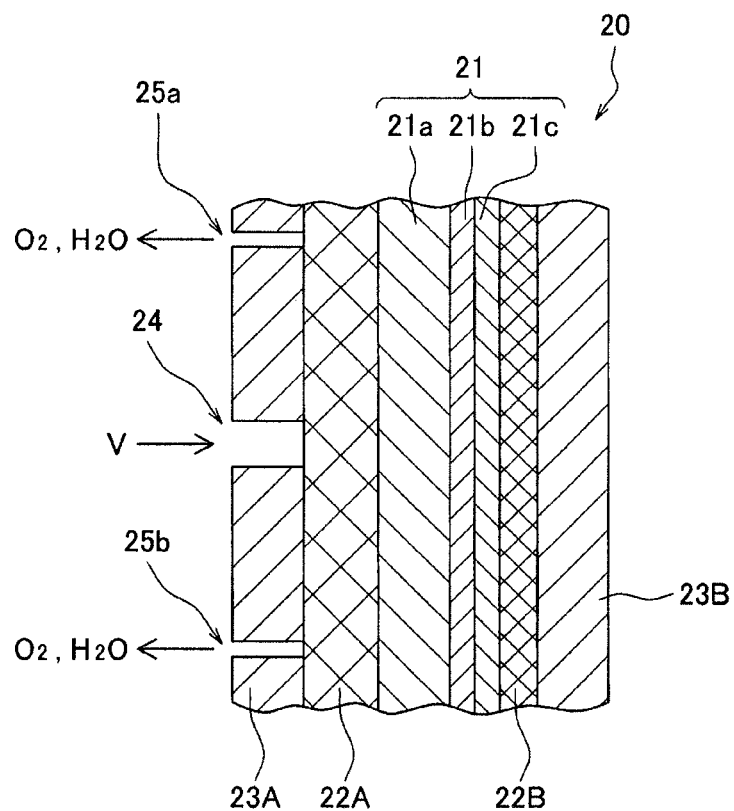
FIG. 11 is a schematic cross-sectional view of a structure of a related part of a hydrogen production apparatus employing a SOEC method.
Figure 12A:
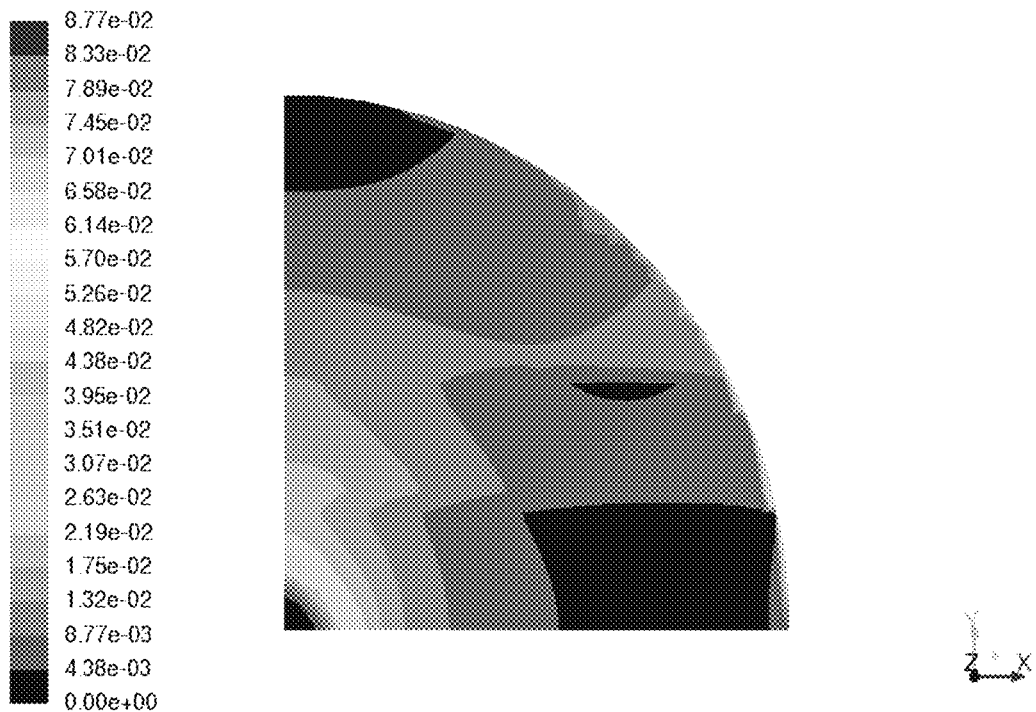
FIG. 12A includes a graph showing evaluation results of the gas diffusing property of a fuel cell according to Example 1-1.
Figure 12B:
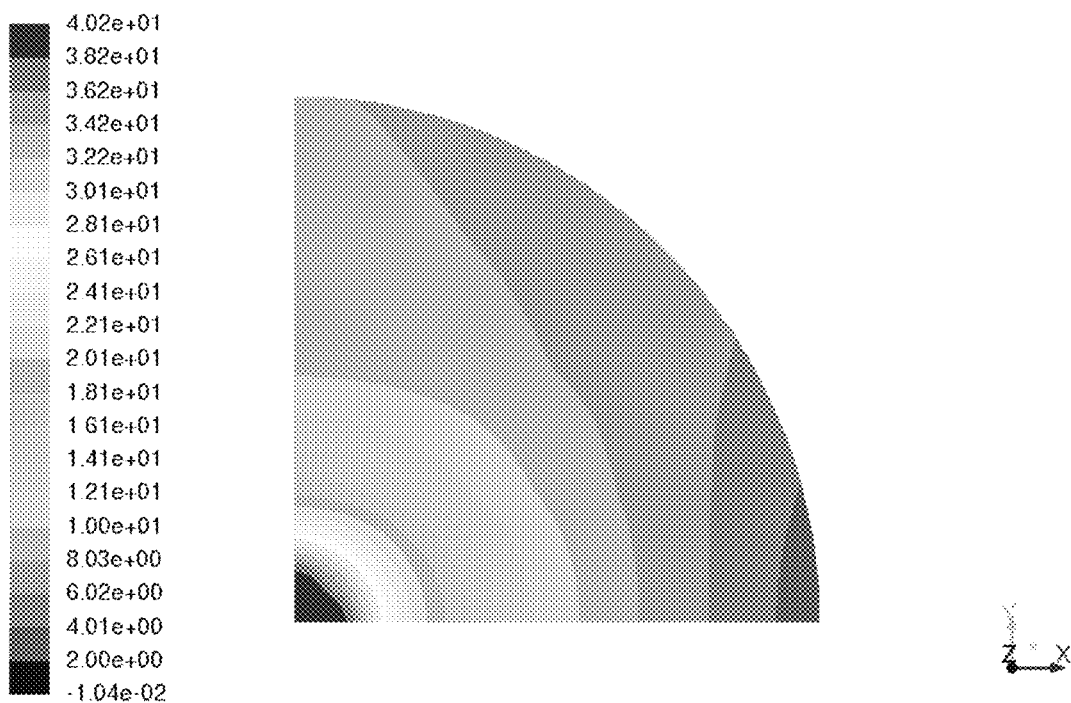
FIG. 12B includes a graph showing evaluation results of the gas diffusing property of a fuel cell according to Example 1-1.
Figure 12C:
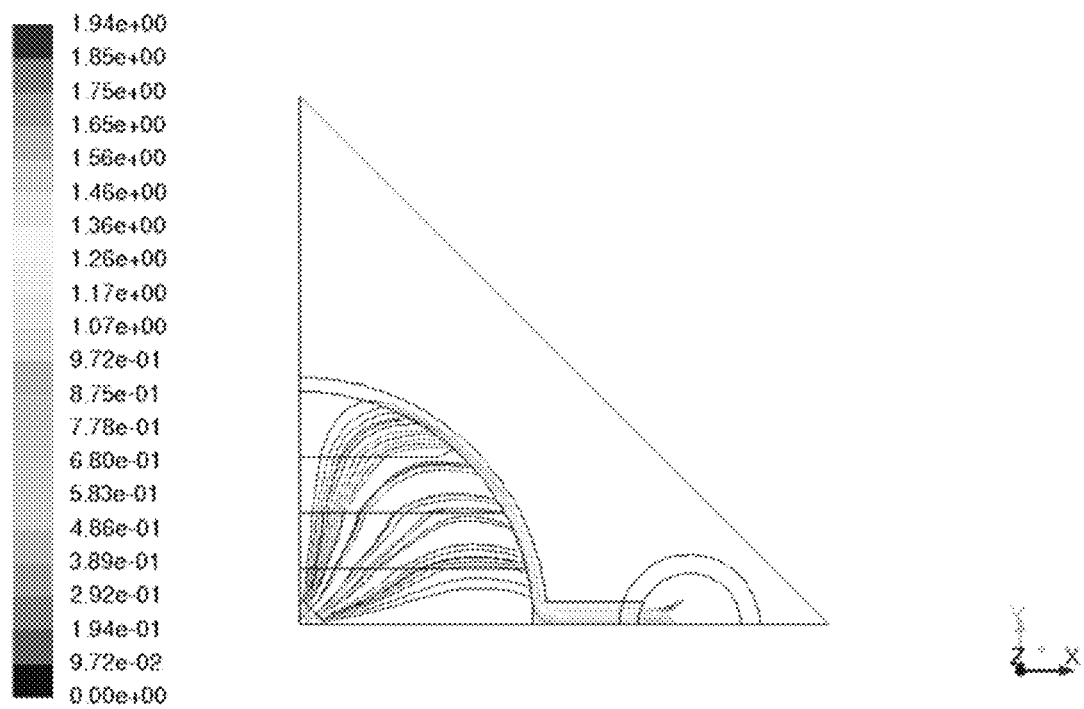
FIG. 12C includes a graph showing evaluation results of the gas diffusing property of a fuel cell according to Example 1-1.
Figure 12D:
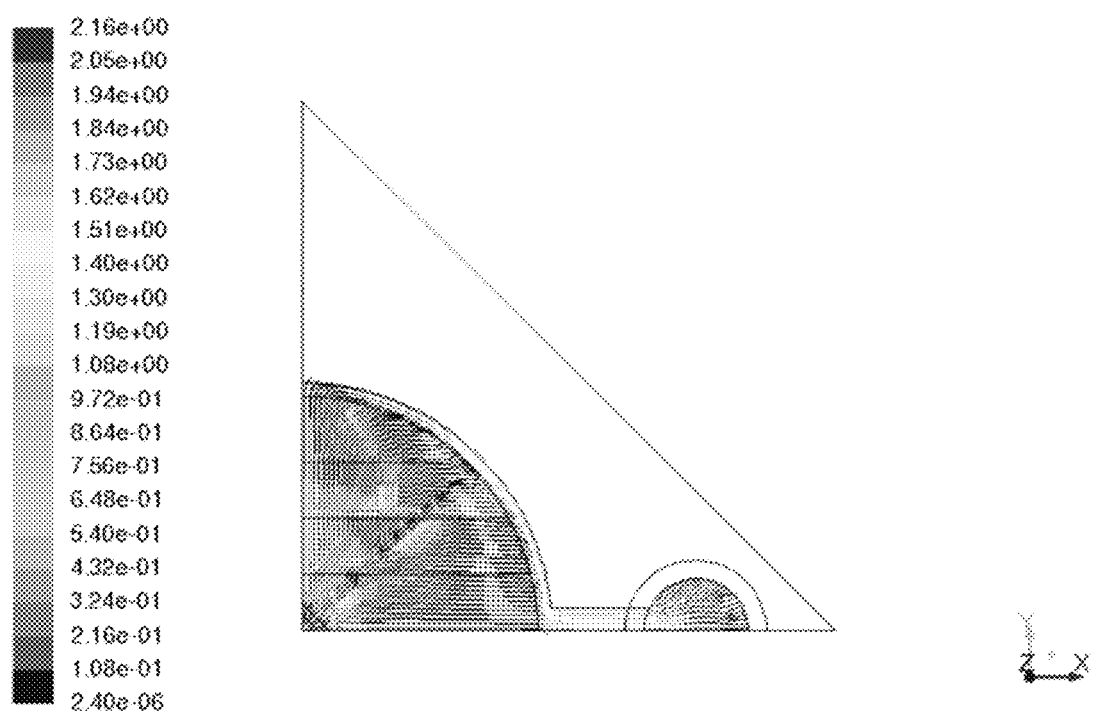
FIG. 12D includes a graph showing evaluation results of the gas diffusing property of a fuel cell according to Example 1-1.
Figure 13A:
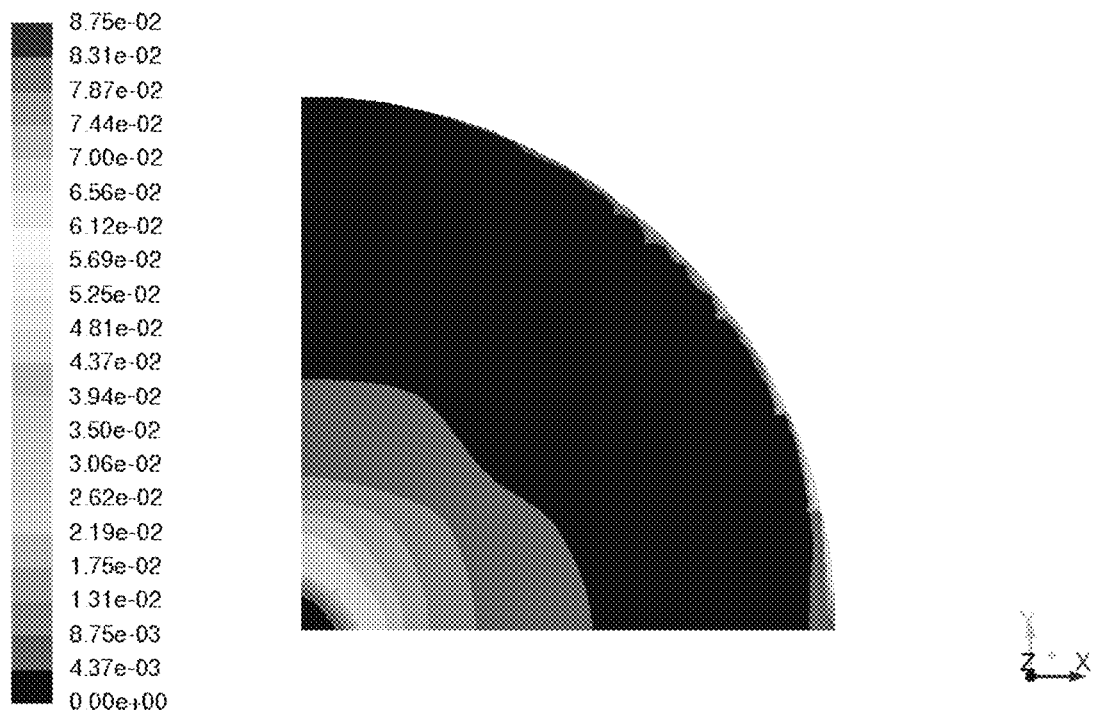
FIG. 13A includes a graph showing evaluation results of the gas diffusing property of a fuel cell according to Example 1-2.
Figure 13B:
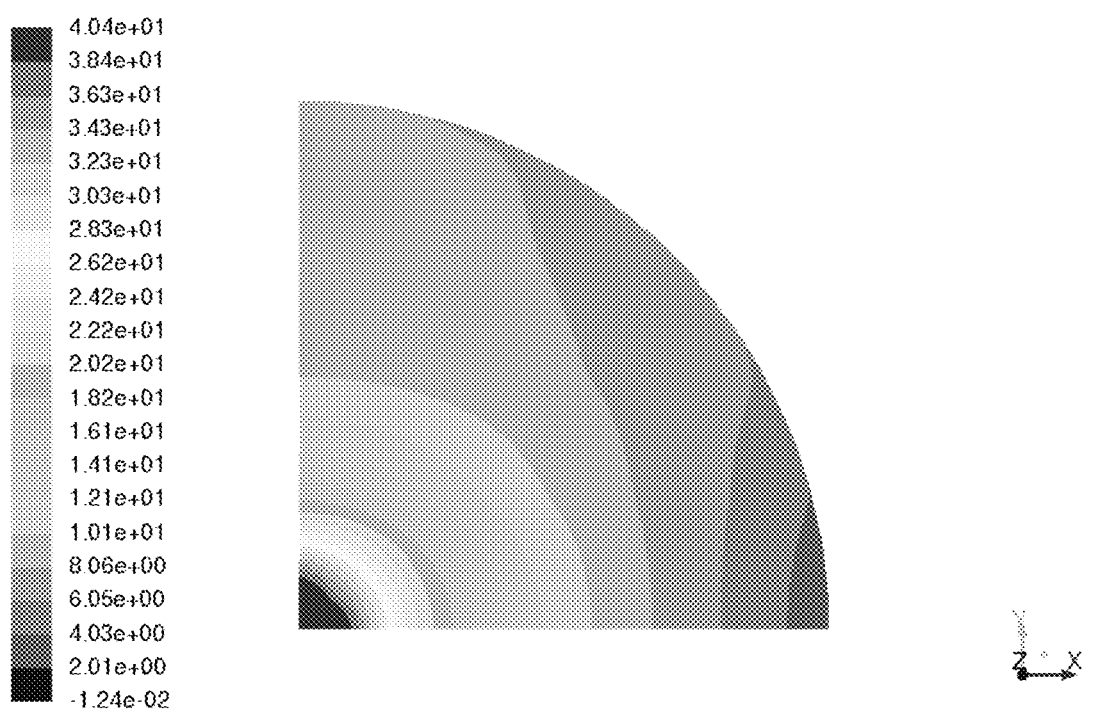
FIG. 13B includes a graph showing evaluation results of the gas diffusing property of a fuel cell according to Example 1-2.
Figure 13C:
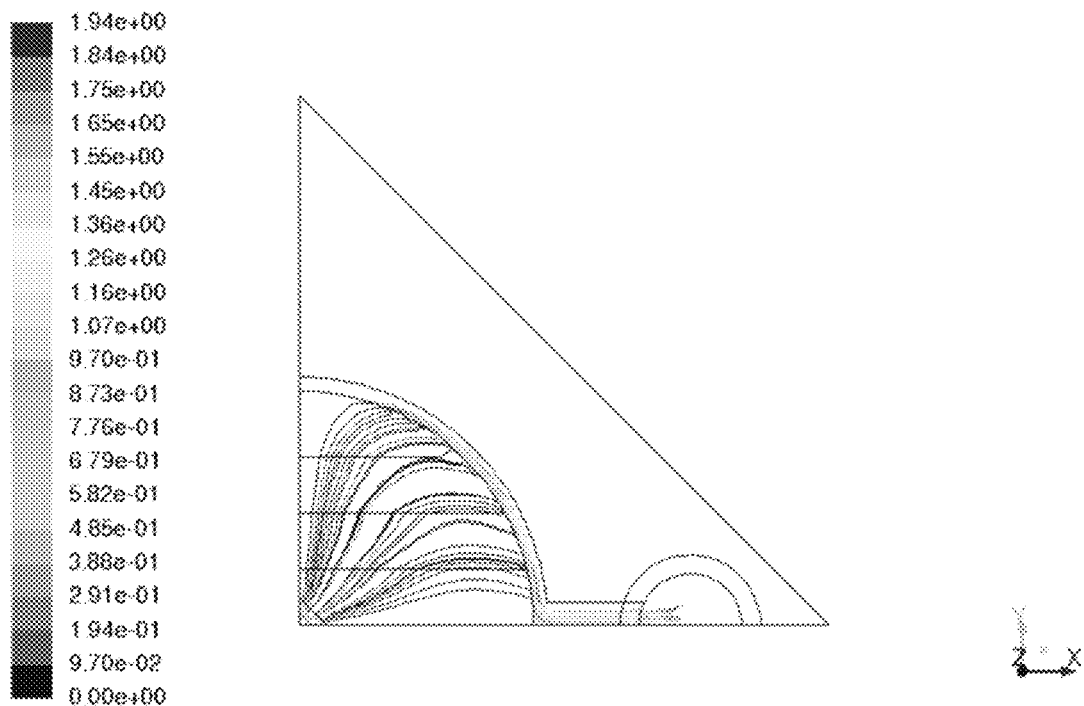
FIG. 13C includes a graph showing evaluation results of the gas diffusing property of a fuel cell according to Example 1-2.
Figure 13D:
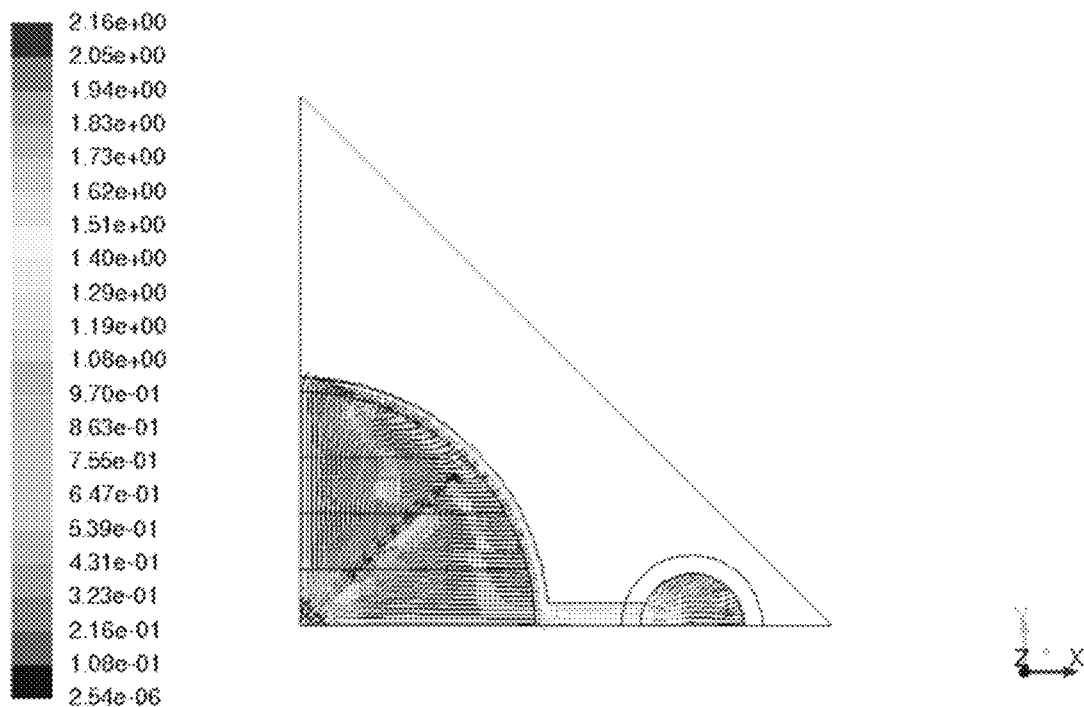
FIG. 13D includes a graph showing evaluation results of the gas diffusing property of a fuel cell according to Example 1-2.
Figure 14A:
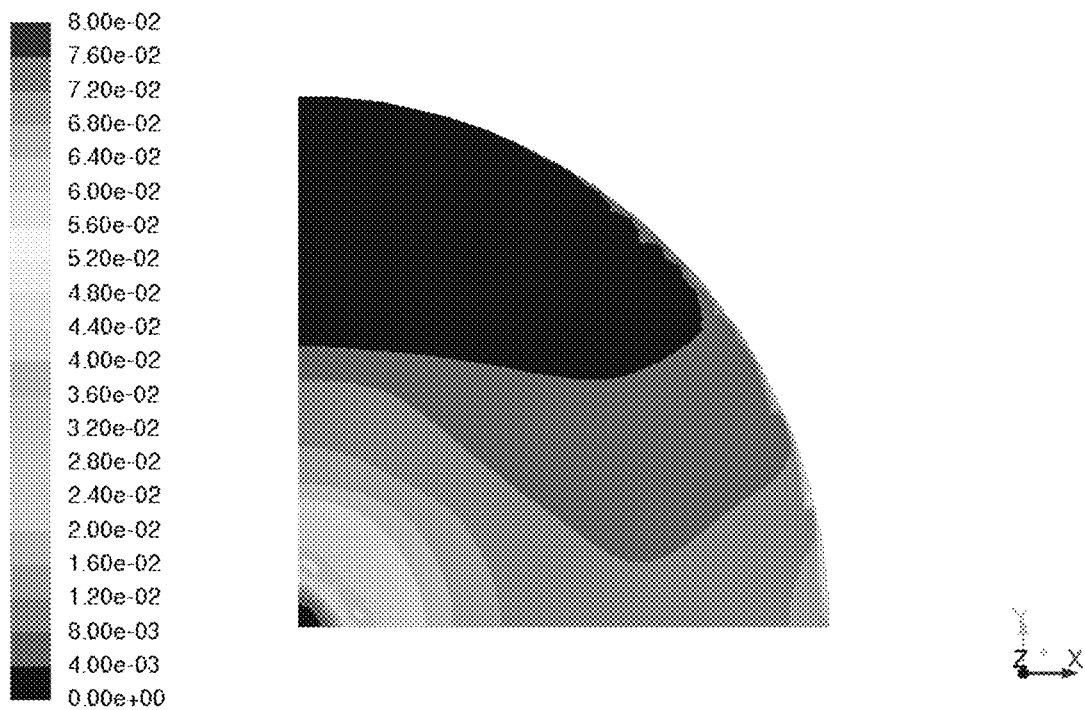
FIG. 14A includes a graph showing evaluation results of the gas diffusing property of a fuel cell according to Example 1-3.
Figure 14B:
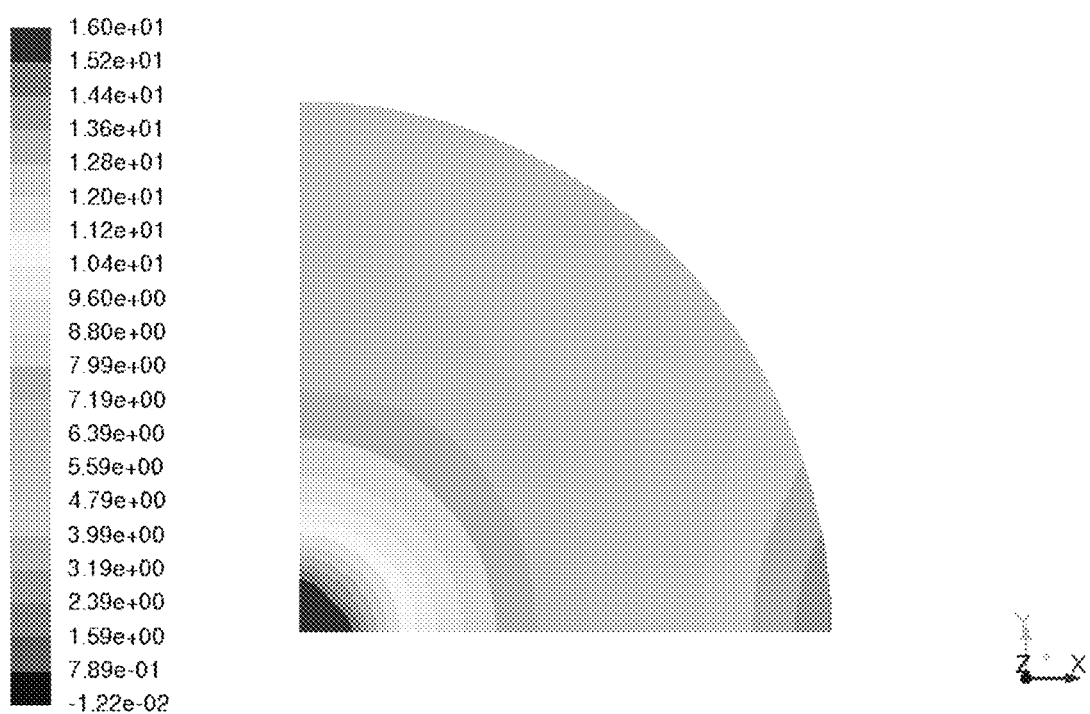
FIG. 14B includes a graph showing evaluation results of the gas diffusing property of a fuel cell according to Example 1-3.
Figure 14C:
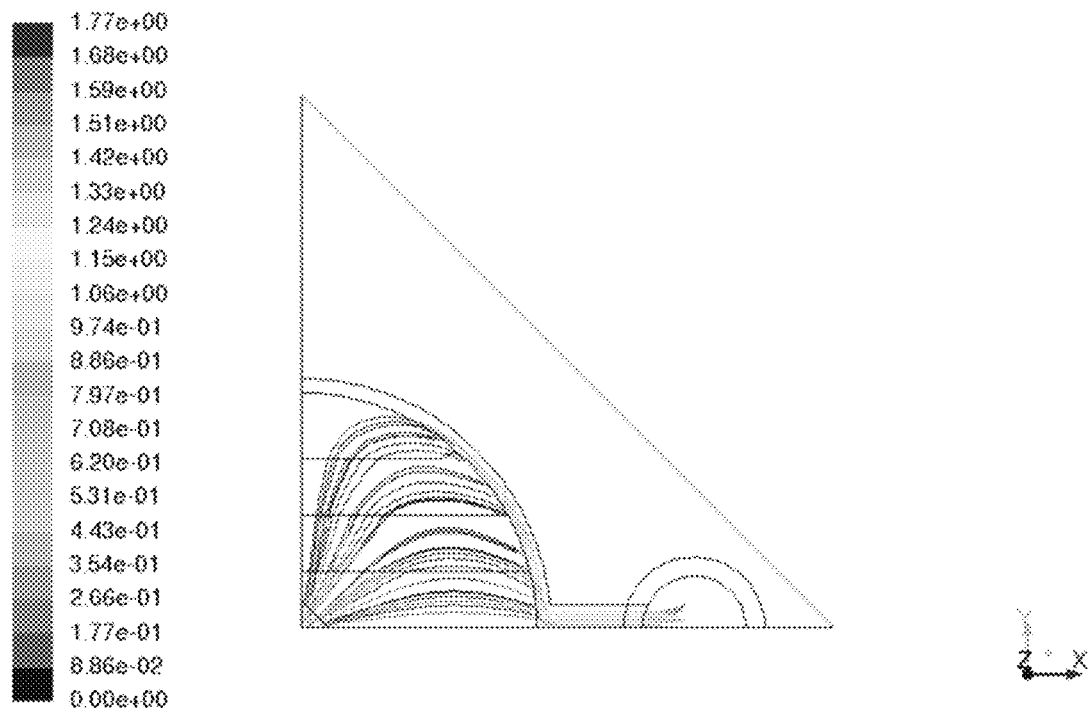
FIG. 14C includes a graph showing evaluation results of the gas diffusing property of a fuel cell according to Example 1-3.
Figure 14D:
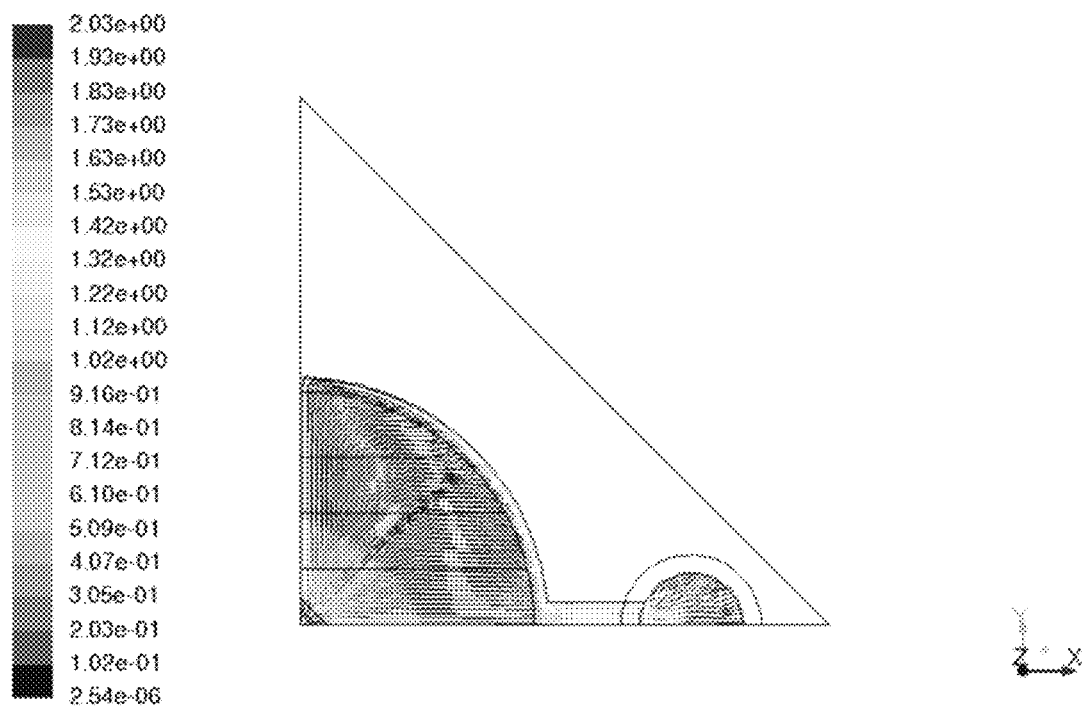
FIG. 14D includes a graph showing evaluation results of the gas diffusing property of a fuel cell according to Example 1-3.
Figure 15A:
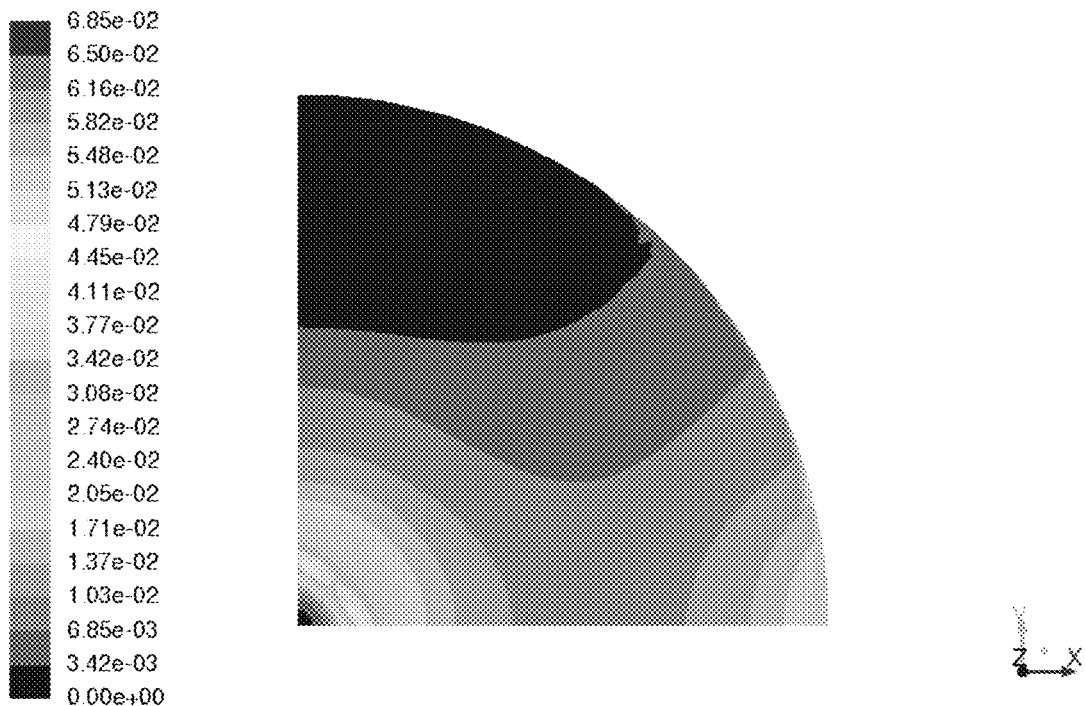
FIG. 15A includes a graph showing evaluation results of the gas diffusing property of a fuel cell according to Example 1-4.
Figure 15B:
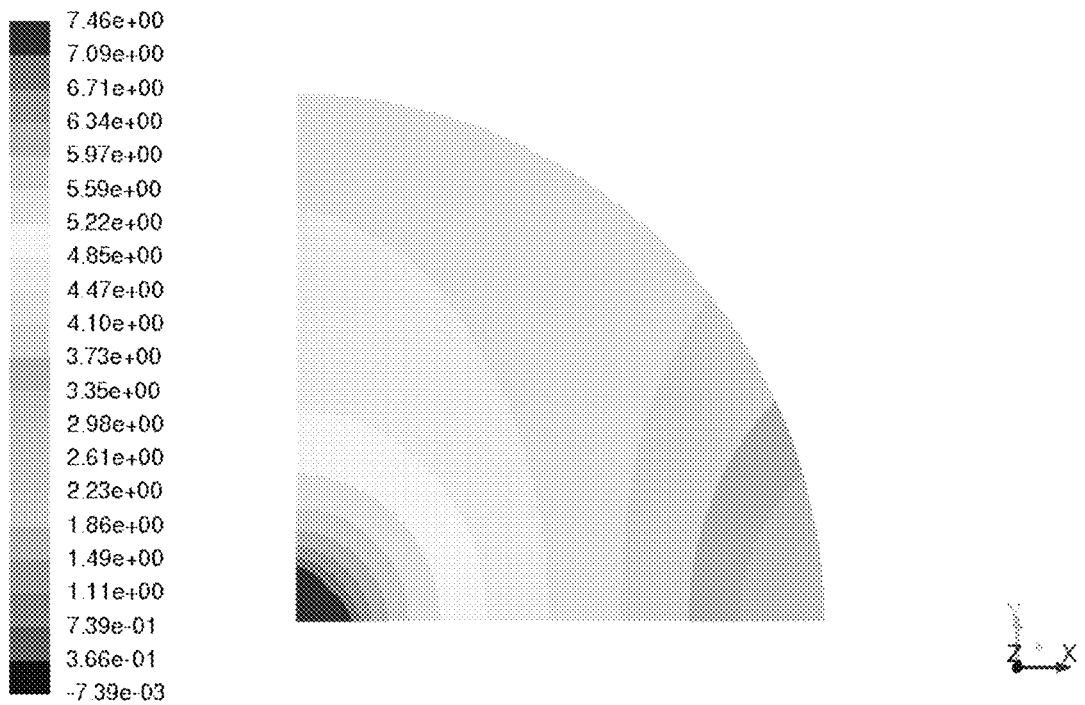
FIG. 15B includes a graph showing evaluation results of the gas diffusing property of a fuel cell according to Example 1-4.
Figure 15C:
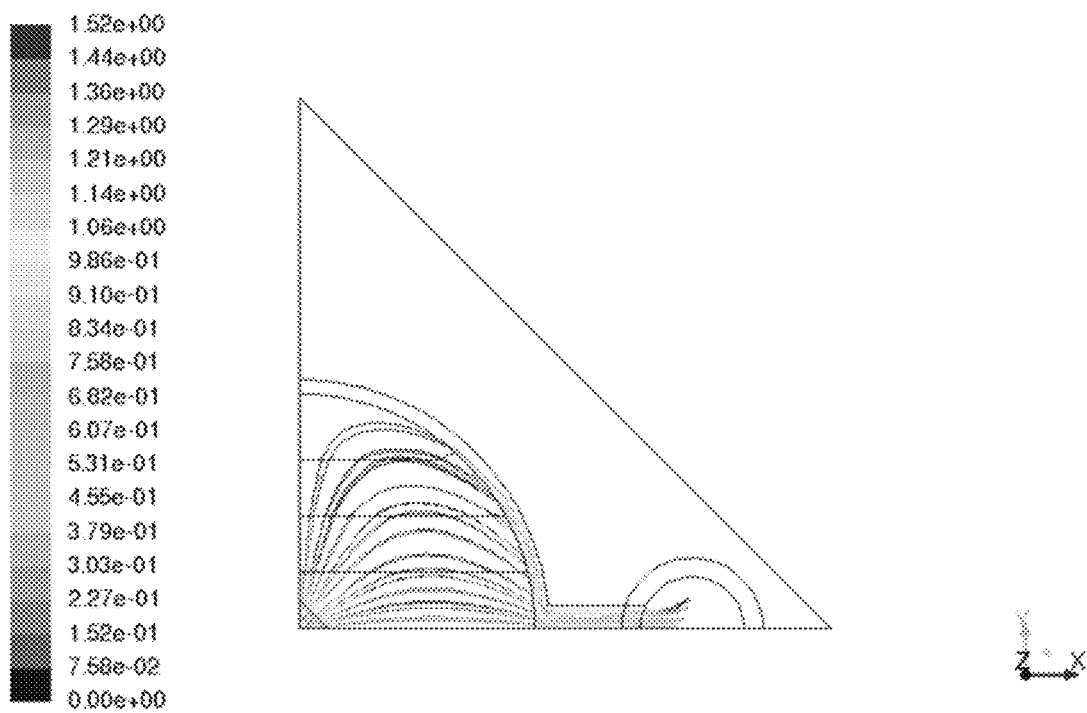
FIG. 15C includes a graph showing evaluation results of the gas diffusing property of a fuel cell according to Example 1-4.
Figure 15D:
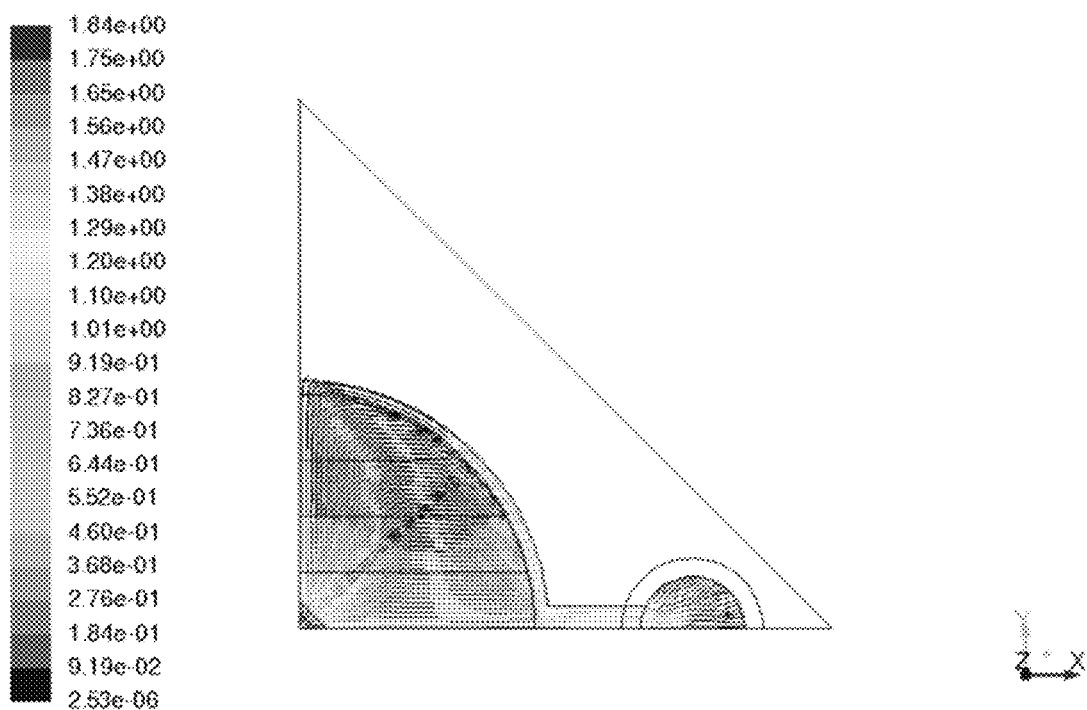
FIG. 15D includes a graph showing evaluation results of the gas diffusing property of a fuel cell according to Example 1-4.
Figure 16A:
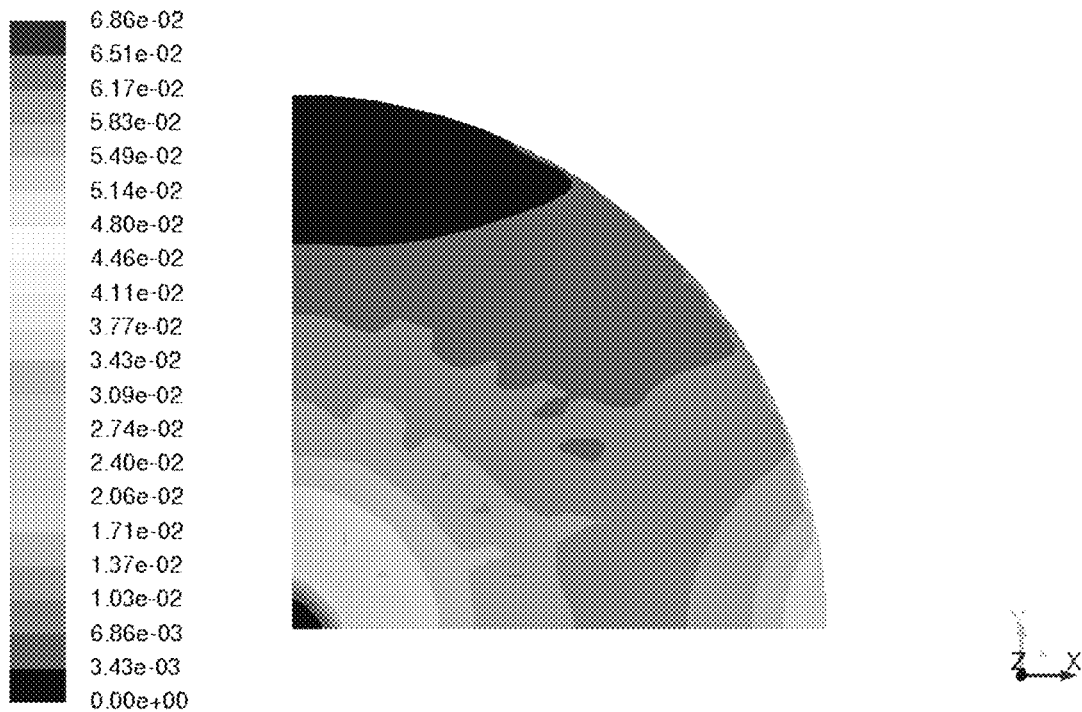
FIG. 16A includes a graph showing evaluation results of the gas diffusing property of a fuel cell according to Example 2-1.
Figure 16B:
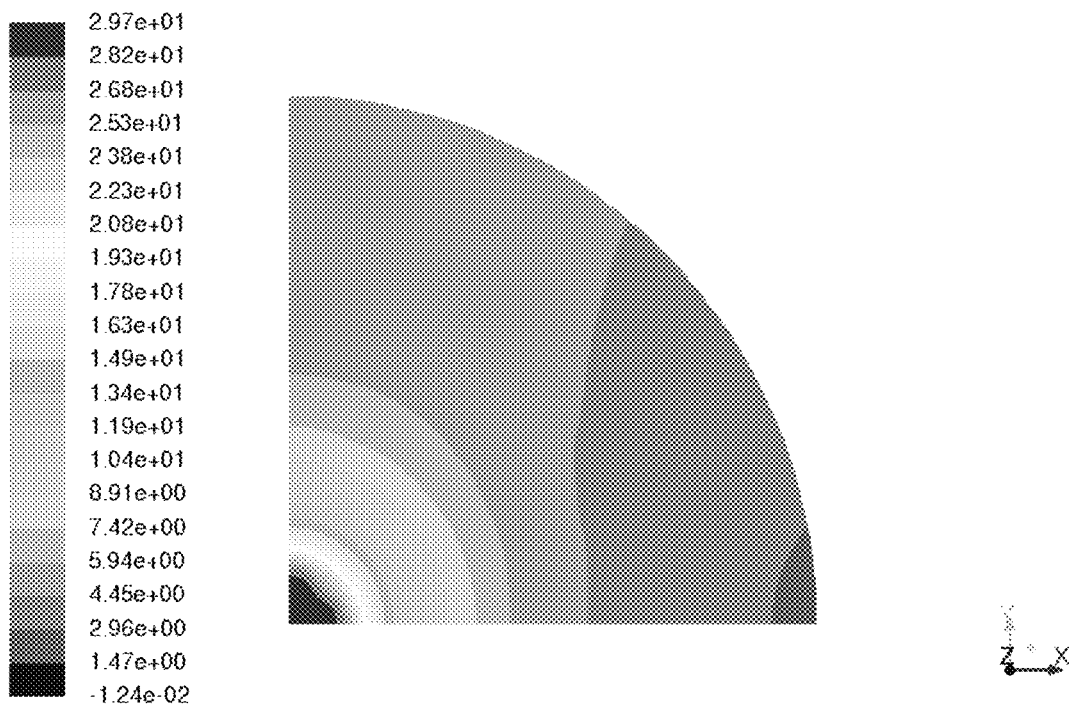
FIG. 16B includes a graph showing evaluation results of the gas diffusing property of a fuel cell according to Example 2-1.
Figure 16C:
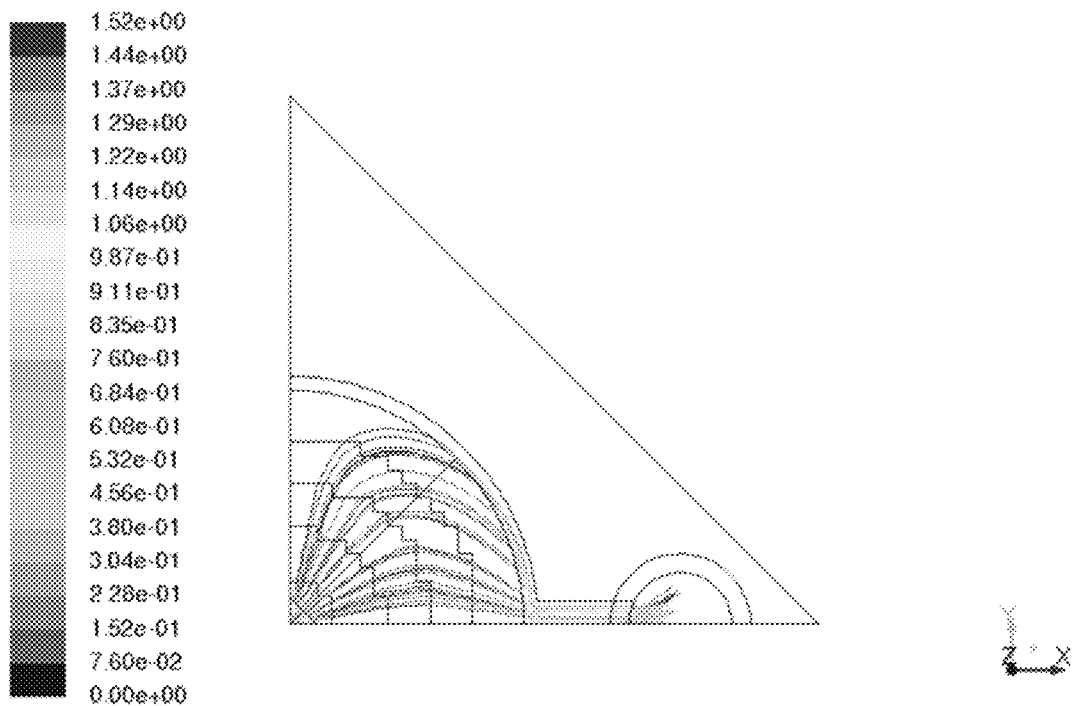
FIG. 16C includes a graph showing evaluation results of the gas diffusing property of a fuel cell according to Example 2-1.
Figure 16D:
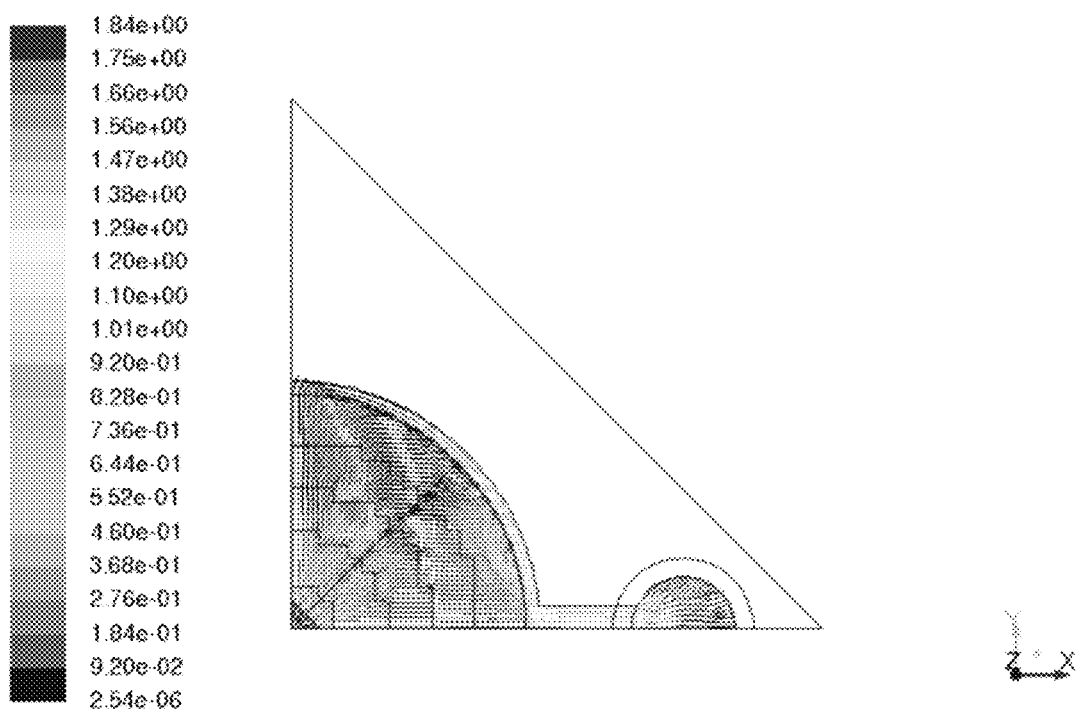
FIG. 16D includes a graph showing evaluation results of the gas diffusing property of a fuel cell according to Example 2-1.
Figure 17A:
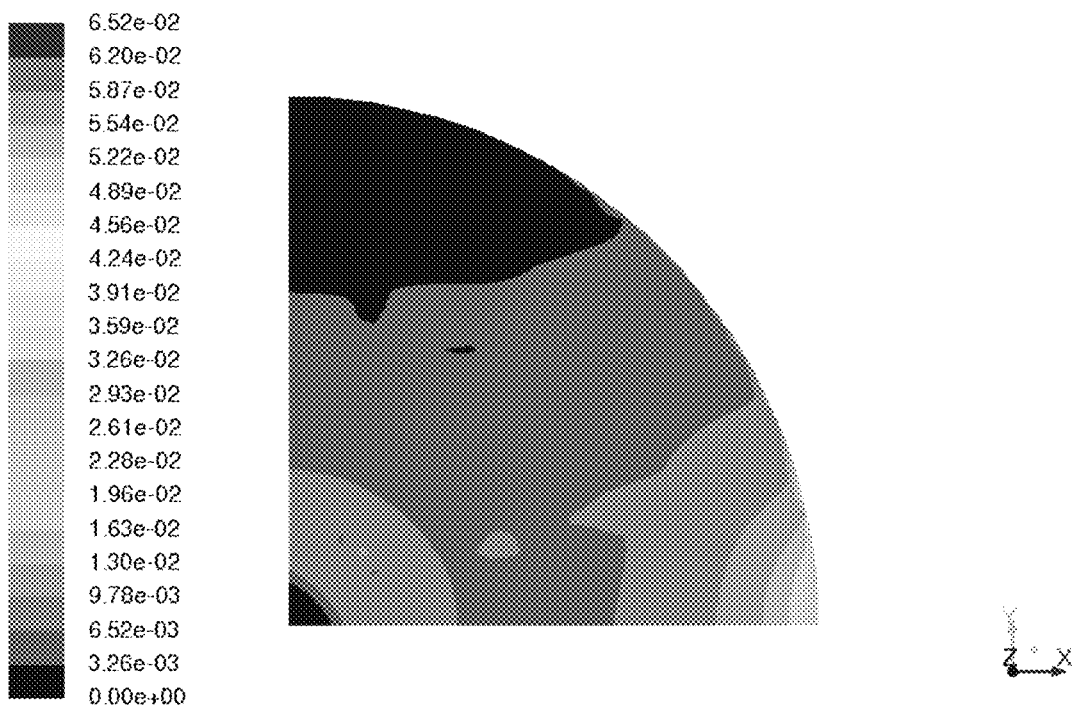
FIG. 17A includes a graph showing evaluation results of the gas diffusing property of a fuel cell according to Example 2-2.
Figure 17B:
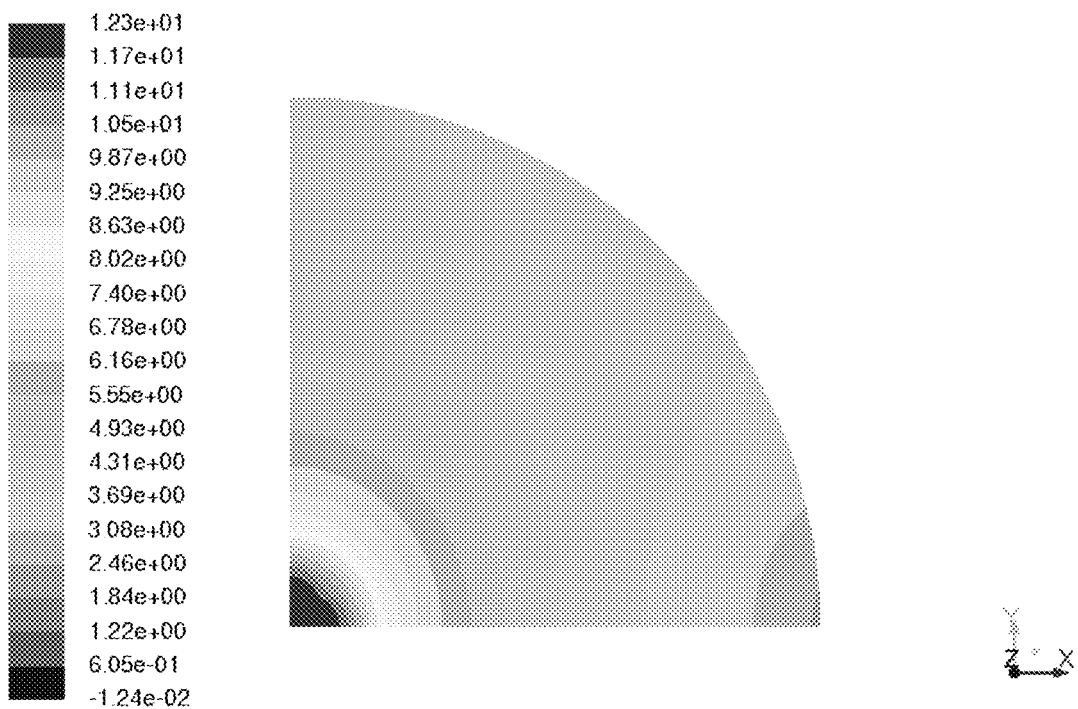
FIG. 17B includes a graph showing evaluation results of the gas diffusing property of a fuel cell according to Example 2-2.
Figure 17C:
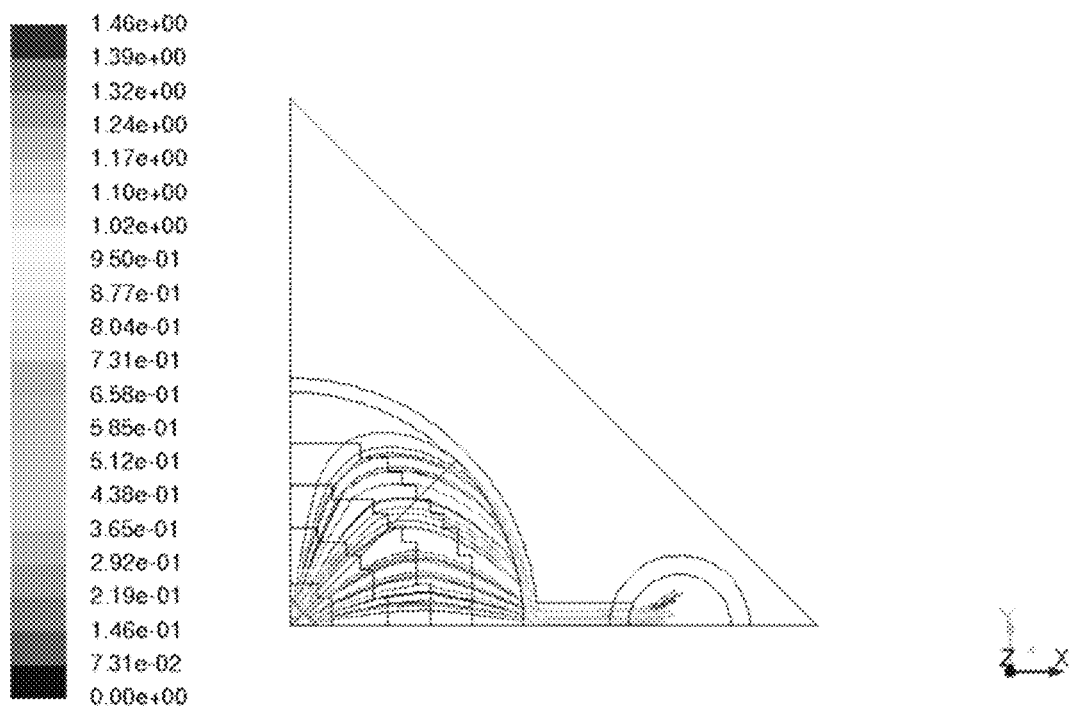
FIG. 17C includes a graph showing evaluation results of the gas diffusing property of a fuel cell according to Example 2-2.
Figure 17D:
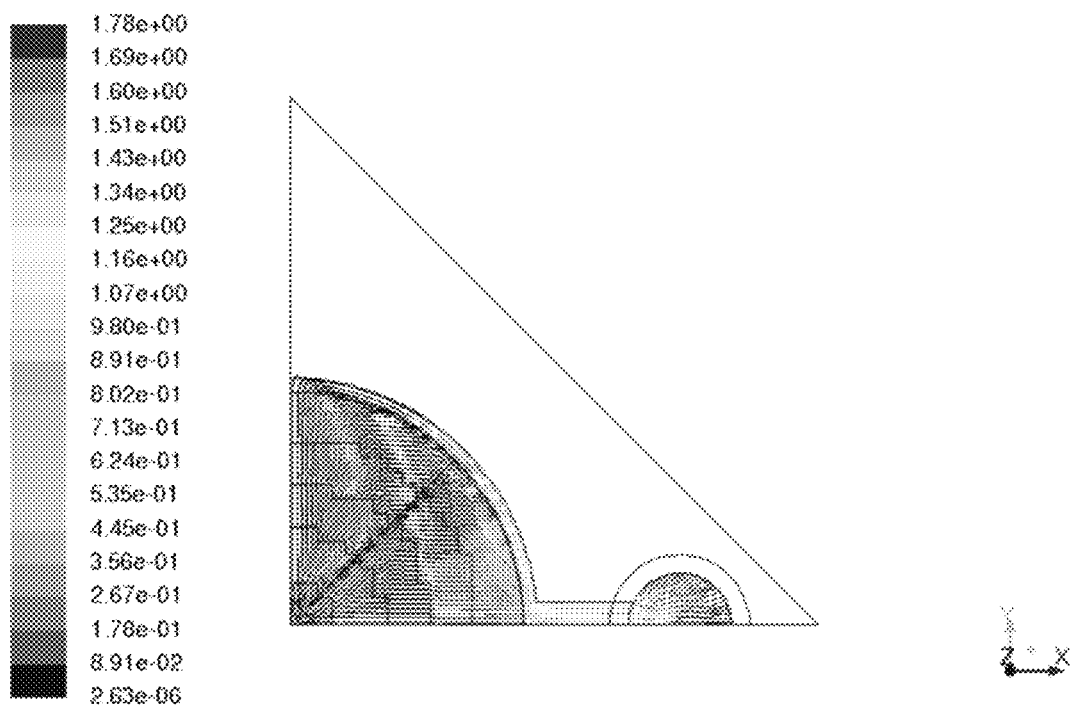
FIG. 17D includes a graph showing evaluation results of the gas diffusing property of a fuel cell according to Example 2-2.
Figure 18A:
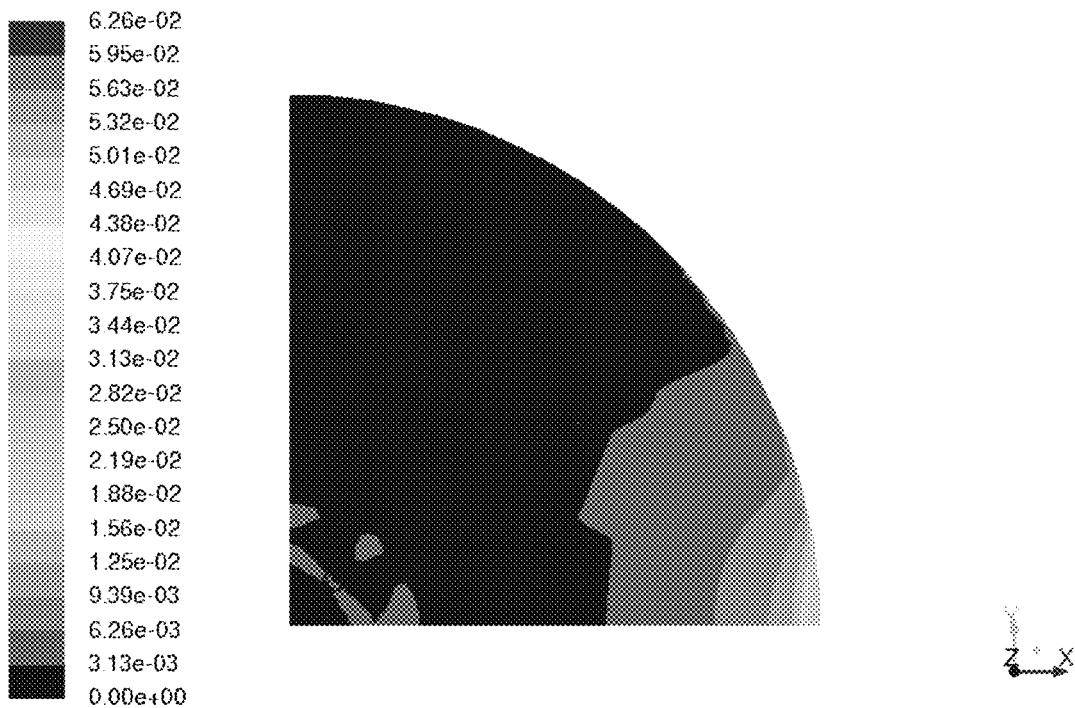
FIG. 18A includes a graph showing evaluation results of the gas diffusing property of a fuel cell according to Example 2-3.
Figure 18B:
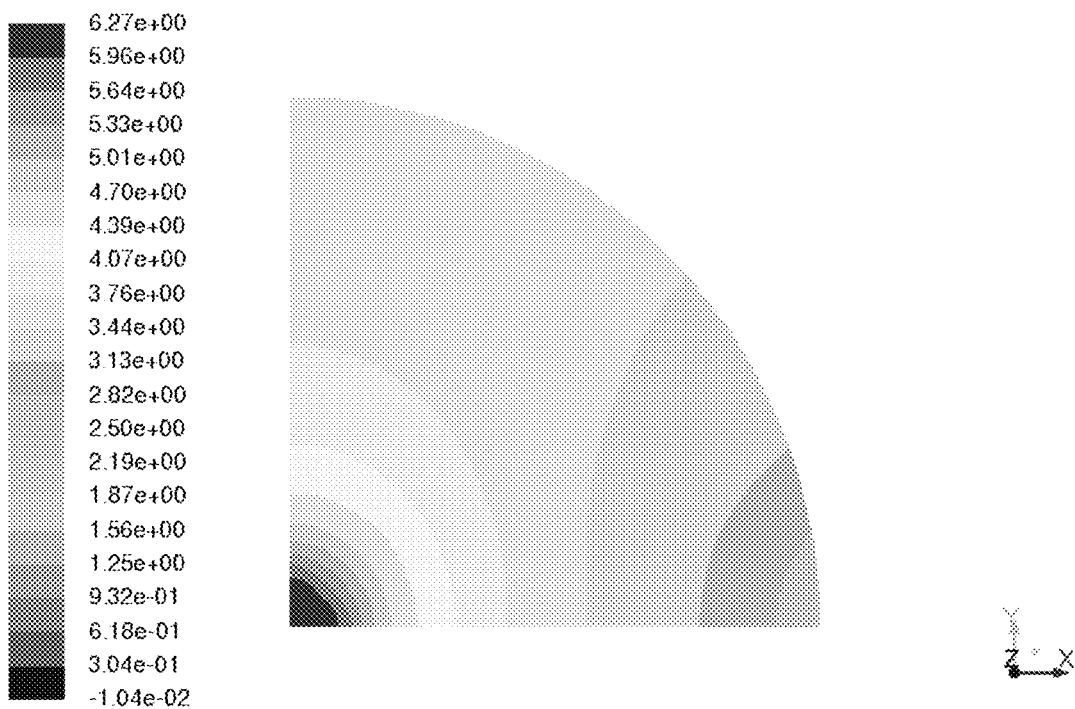
FIG. 18B includes a graph showing evaluation results of the gas diffusing property of a fuel cell according to Example 2-3.
Figure 18C:
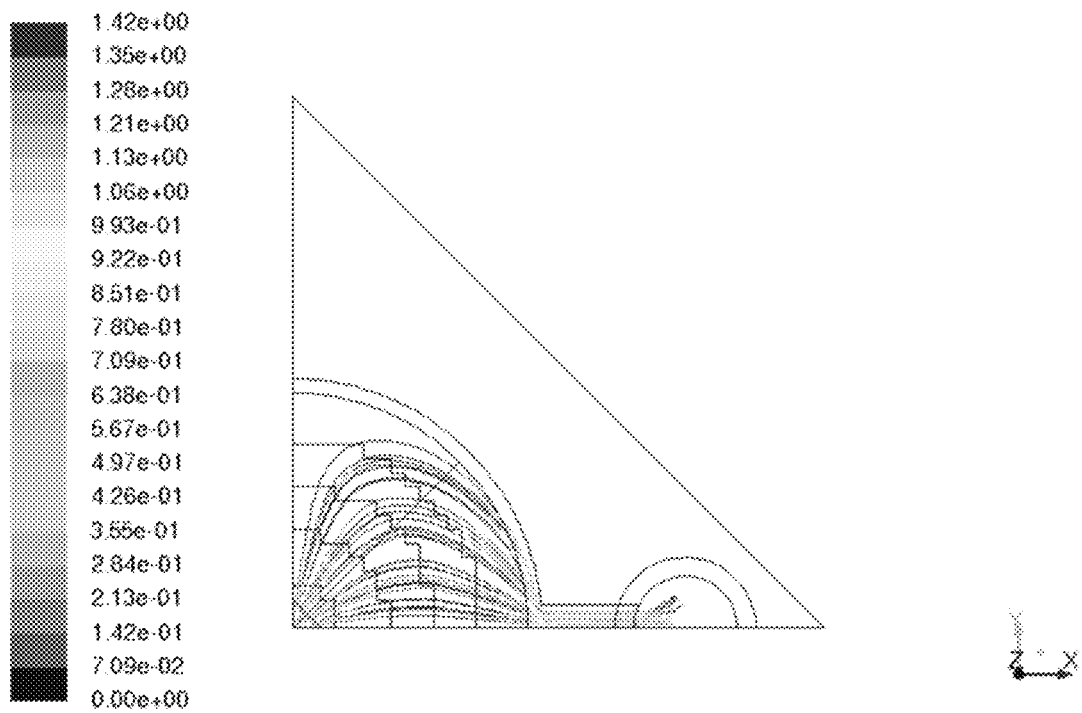
FIG. 18C includes a graph showing evaluation results of the gas diffusing property of a fuel cell according to Example 2-3.
Figure 18D:
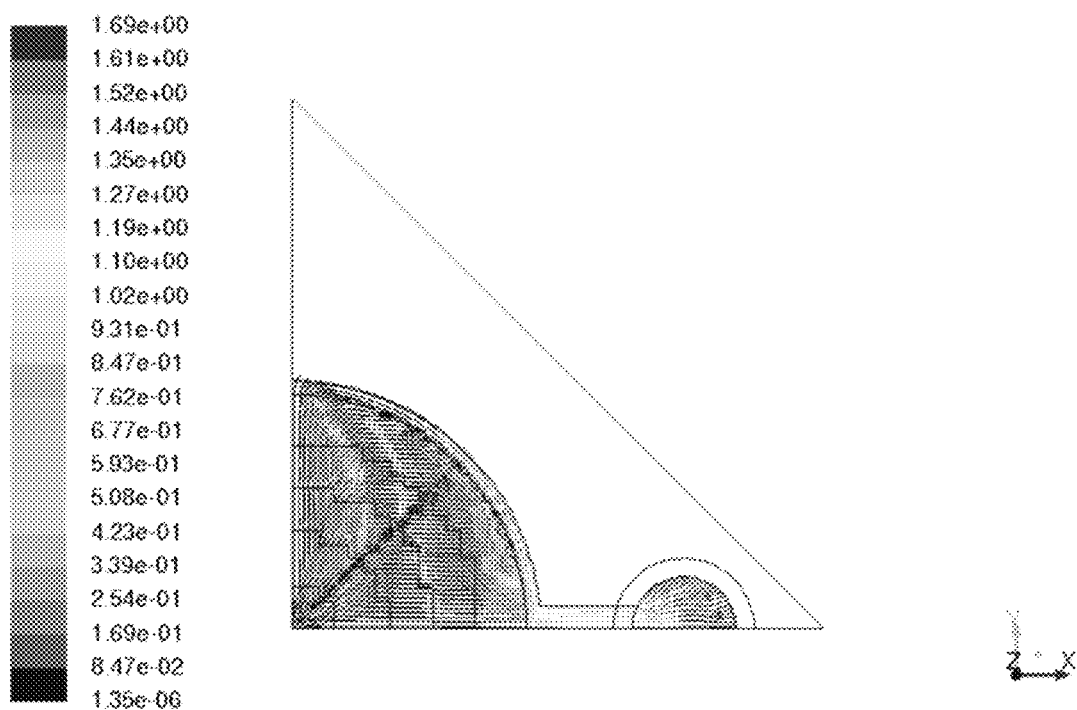
FIG. 18D includes a graph showing evaluation results of the gas diffusing property of a fuel cell according to Example 2-3.

FIG. 11 is a schematic diagram of a section of a relevant part of a SOEC hydrogen production apparatus 20 that uses a protonically conductive solid oxide electrolyte membrane. In FIG. 11, a power supply is not illustrated. The hydrogen production apparatus 20 includes a structure 21 that includes a solid oxide electrolyte membrane 21b, an anode 22A and a cathode 22B that respectively oppose two main surfaces of the structure 21, a plate member 23A that opposes a main surface of the anode 22A on the opposite side of the structure 21, a plate member 23B that opposes a main surface of the cathode 22B on the opposite side of the structure 21, and a power supply not illustrated in the drawing. A steam supply port 24 and gas discharge ports 25a and 25b are formed in the plate member 23A on the anode 22A side. Steam V is introduced from the steam supply port 24 to the anode 22A, and oxygen generated at the anode 22A or unreacted steam is discharged out of the system from the gas discharge ports 25a and 25b.

The anode 22A and the cathode 22B are both a porous metal body that has the above-described three-dimensional mesh-like skeleton. Furthermore, the anode 22A is constituted by the porous metal body S and the porous metal body H. The porous metal body S is placed so as to oppose at least the steam supply port 24 formed in the plate member 23A. The porous metal body H is disposed in portions of the anode 22A other than the porous metal body S. The plate members 23A and 23B are separators arranged to prevent steam and oxygen from mixing with hydrogen.

The SOEC hydrogen production apparatus 20 has the same structure as the fuel cell 10 illustrated in FIG. 1 except for that the apparatus is equipped with the cathode 22B, the plate member 23B, and the power supply. The structure 21 includes the solid oxide electrolyte membrane 21b that contains a protonically conductive solid oxide, and porous layers 21a and 21c that are arranged to respectively oppose the main surfaces of the solid oxide electrolyte membrane 21b. The porous layers 21a and 21c support the solid oxide electrolyte membrane 21b. The solid oxide electrolyte membrane 21b contains a protonically conductive solid oxide, which is the same as an example described as the solid electrolyte layer 1b. As with the anode 1a, the porous layer 21a disposed on the anode 22A side is formed of a composite oxide of the solid oxide and nickel oxide (NiO) serving as a catalyst component. Thus, the electrolysis efficiency is further enhanced. The porous layer 21c is formed of the same compound as one described as examples for the cathode 1c, for example.

The structure of the plate member 23A corresponds to the interconnector 3. The plate member 23B may have any structure, for example, the same structure as the interconnector used in a fuel cell. A gas channel not illustrated in the drawing may be formed in the plate member 23B adjacent to the cathode 22B. In this case, hydrogen generated at the cathode 22B can be extracted through the gas channel.

[Notes]

Regarding the hydrogen production apparatus that uses the alkaline water electrolysis method, the following note 1-1 is disclosed.

(Note 1-1)

A hydrogen production apparatus comprising:

an electrolytic bath that contains an alkaline aqueous solution;

an anode and a cathode immersed in the alkaline aqueous solution; and a power supply for applying voltage between the anode and the cathode, wherein at least one of the anode and the cathode includes a porous metal body that has a three-dimensional mesh-like skeleton.

Regarding the method for producing hydrogen by using the alkaline water electrolysis method, the following note 1-2 is disclosed.

(Note 1-2)

A method for producing hydrogen, comprising:

a step of preparing an anode, a cathode, and an alkaline aqueous solution;

a step of immersing the anode and the cathode in the alkaline aqueous solution; and a step of applying voltage between the anode and the cathode, wherein at least one of the anode and the cathode includes a porous metal body that has a three-dimensional mesh-like skeleton.

Regarding the hydrogen production apparatus that uses the PEM method, the following note 2-1 is disclosed.

(Note 2-1)

A hydrogen production apparatus comprising:

an anode;

a cathode;

a polymer electrolyte membrane disposed between the anode and the cathode; and a power supply that applies voltage between the anode and the cathode, wherein at least the anode includes a porous metal body that has a three-dimensional mesh-like skeleton.

Regarding the method for producing hydrogen by using the PEM method, the following note 2-2 is disclosed.

(Note 2-2)

A method for producing hydrogen, comprising:

a step of preparing an anode, a cathode, and a polymer electrolyte membrane disposed between the anode and the cathode; a step of introducing water to the anode; and a step of applying voltage between the anode and the cathode, wherein at least the anode includes a porous metal body that has a three-dimensional mesh-like skeleton.

Regarding the hydrogen production apparatus that uses the SOEC method, the following note 3-1 is disclosed.

(Note 3-1)

A hydrogen production apparatus comprising:

an anode;

a cathode;

a solid oxide electrolyte membrane disposed between the anode and the cathode; and a power supply that applies voltage between the anode and the cathode, wherein at least one of the anode and the cathode includes a porous metal body that has a three-dimensional mesh-like skeleton.

Regarding the method for producing hydrogen by using the SOEC method, the following note 3-2 is disclosed.

(Note 3-2)

A method for producing hydrogen comprising:

a step of preparing an anode, a cathode, and a solid oxide electrolyte membrane disposed between the anode and the cathode;

a step of introducing steam to the anode or cathode; and a step of applying voltage between the anode and the cathode, wherein, of the anode and the cathode, at least the electrode to which the steam is introduced includes a porous metal body that has a three-dimensional mesh-like skeleton.

A porous metal body that has a three-dimensional mesh-like skeleton has a large surface area, high porosity, and excellent electrical conductivity. According to the hydrogen production apparatuses and the methods for producing hydrogen disclosed in the notes, the porous metal body is included in at least one of the anode and the cathode, and thus the water (steam) electrolysis efficiency is improved. In particular, in the PEM method and SOEC method, when, of the anode and the cathode, the electrode to which water or steam is introduced includes multiple porous metal bodies with different porosities, the water electrolysis efficiency is further improved. Here, the porous metal body having smaller porosity is arranged to oppose the water or steam supply port.

The present invention will now be specifically described by using examples. These examples do not limit the present invention.

Production Examples a to g

Product Nos. #1 to #6 and #8 of nickel CELMET (registered trademark) produced by Sumitomo Electric Industries, Ltd., were prepared as precursors (precursors a to g) of seven porous metal bodies with different porosities.

The porosities and the like of the precursors a to g are indicated in Table 1.

TABLE 1

| Precursor | Porosity (vol %) | Cell density (cells/inch) | Cell size (μm) | Pore size (μm) | Specific surface area (cm²/g) | Width of skeleton (μm) |
|---|---|---|---|---|---|---|
| a | 94 | 6~10  | 3200 | 1600 | 250  | 500 |
| b | 94 | 11~16 | 1900 | 950  | 500  | 200 |
| c | 94 | 17~23 | 1300 | 650  | 850  | 120 |
| d | 94 | 27~33 | 900  | 450  | 1250 | 80  |
| e | 94 | 37~43 | 700  | 350  | 1850 | 60  |
| f | 94 | 46~50 | 550  | 280  | 2800 | 40  |
| g | 94 | 56~60 | 450  | 230  | 5800 | 30  |

Production Examples A to F

The obtained precursors a to g were cut into desired shapes and combined to form a first precursor.

Separately, one of the precursor a to g was cut into the same size as the first precursor so as to form a second precursor. The first precursor and the second precursor are stacked and roll-pressed at a load of 1 MPa so as to bond the first precursor and the second precursor. The configurations of the composite materials A to F obtained as a result are indicated in Tables 2 and 3. Note that the porosity, the pore size, and the cell size of each porous metal body included in the first porous metal body and the second porous metal body respectively decreased by 5% compared to the precursors a to g. The composite materials will now be described in detail.

(1) Composite Materials A to C

The composite materials A to C were each formed by bonding a first precursor, was used in common, and a second precursor, which differed among the materials. In the first precursor, one precursor was used in the first region SR (porous metal body S), and the following multiple precursors were used in the second region HR (porous metal body H). The first precursor was configured to have divided regions $HR_1$ to $HR_6$ instead of the divided regions $HR_1$ to $HR_4$ illustrated in FIG. 5B. Specifically, the divided region $HR_5$ was additionally placed on the outer side of the divided region $HR_3$ illustrated in FIG. 5B, and the divided region $HR_6$ was additionally placed on the outer side of the divided region $HR_4$. The width (length in the direction perpendicular to the straight line L) of the porous metal body S after press-forming was 12 mm, the width of each of the porous metal bodies ($HR_1$ to $HR_6$) constituting the porous metal body H was 24 mm, and the thickness of the first porous metal body and the second porous metal body was 1 mm each. The types and arrangements of the precursors used in the composite materials A to C, and the porosities after press-forming are indicated in Table 2.

TABLE 2

| Composite material | First porous metal body | | | | | | | Second porous metal body |
|---|---|---|---|---|---|---|---|---|
| | SR | $HR_1$ | $HR_2$ | $HR_3$ | $HR_4$ | $HR_5$ | $HR_6$ | |
| A | g | f | f | b | b | a | a | g |
| B | g | f | f | b | b | a | a | d |
| C | g | f | f | b | b | a | a | a |
| Porosity after pressing (vol %) | 85 | 90 | 90 | 90 | 90 | 90 | 90 | 94 |

(2) Composite Materials D to F

The composite materials D to F were each formed by bonding a first precursor, which was used in common, and a second precursor, which differed among the materials. In the first precursor, one precursor was used in the first region SR (porous metal body S), and the following multiple precursors were used in the second region HR (porous metal body H). The first precursor was configured to have divided regions $HR_1$ to $HR_4$ instead of the divided regions $HR_1$ and $HR_2$ illustrated in FIG. 7B. Specifically, the ring-shaped divided region $HR_3$ was additionally placed on the outer side of the ring-shaped divided region $HR_2$ illustrated in FIG. 7B, and the ring-shaped divided region $HR_4$ was additionally placed on the outer side of the ring-shaped divided region $HR_3$. The width (length in the direction perpendicular to the straight line L) of the porous metal body S after press-forming was 10 mm, the width ((outer diameter–inner diameter)/2) of each of the porous metal bodies ($HR_1$ to $HR_4$) constituting the porous metal body H was 10 mm, and the average thickness of the first porous metal body and the second porous metal body was 1 mm each. The types and arrangements of the precursors used in the composite materials D to F, and the porosities after press-forming are indicated in Table 3.

TABLE 3

| Composite material | First porous metal body | | | | | Second porous metal body |
|---|---|---|---|---|---|---|
| | SR | $HR_1$ | $HR_2$ | $HR_3$ | $HR_4$ | |
| D | g | f | d | b | a | g |
| E | g | f | d | b | a | d |
| F | g | f | d | b | a | a |
| Porosity after pressing (vol %) | 85 | 90 | 90 | 90 | 90 | 94 |

Example 1-1

The composite material A was used to prepare a fuel cell by the following procedure.
(1) Preparation of MEA
The MEA was prepared by the following procedure.
First, BZY ($BaZr_{0.8}Y_{0.2}O_{2.9}$) was mixed with NiO so that 70 vol % of Ni (catalyst component) was contained, and the resulting mixture was disintegrated and kneaded in a ball mill. Then the obtained kneaded mixture was press-formed to form a formed body (thickness: 550 µm) constituting the anode, and the formed body was calcined at 1000° C. Subsequently, a paste obtained by mixing BZY ($BaZr_{0.8}Y_{0.2}O_{2.9}$) and a water-soluble binder resin (ethyl cellulose) was applied to one surface of the formed body by screen printing, and then the water-soluble binder resin was removed at 750° C. Next, co-sintering was performed in an oxygen atmosphere at 1400° C. so as to form the anode and the solid electrolyte layer (thickness: 10 µm).

Next, an LSCF paste obtained by mixing a cathode material, namely, powder of LSCF ($La_{0.6}HR_{0.4}Co_{0.2}Fe_{0.8}O_{3-\delta}$), and ethyl cellulose was screen-printed on the surface of the solid electrolyte layer and fired at 1000° C. for 2 hours to prepare a MEA. The thickness of the cathode was 10 µm.
(2) Preparation of Fuel Cell The composite material A was placed on the surface of the anode of the MEA obtained as above so that the anode opposed the first porous metal body, and then an anode-side interconnector composed of stainless steel and having a smooth and flat surface was placed thereon. A cathode-side interconnector composed of stainless steel and having a gas channel was placed on the surface of the cathode so as to prepare a fuel cell A illustrated in FIG. 10A.
(3) Evaluation of Gas Diffusing Property At an operation temperature of 600° C., the gas diffusing property when fuel gas (hydrogen) was supplied to the anode of the fuel cell A obtained as above at 0.3 L/min and air was supplied to the cathode at 1 L/min was evaluated. The gas diffusing property was evaluated by the wall shear stress at the anode surface, static pressure, the streamline of the gas, and the velocity vector of the gas. The results are indicated in FIGS. 12A to 12D. FIGS. 12A to 12D indicate FIG. 12A: distribution of the wall shear stress, FIG. 12B: distribution of static pressure, FIG. 12C: streamline of hydrogen gas, and FIG. 12D: velocity vector of hydrogen gas at ¼ from the anode surface (the same applies to FIGS. 13A to 18D). In the drawings, the light-colored part is the sealed part, and in FIGS. 12C and 12D, a semicircle on the lower right side indicates a portion of the discharge port (the same applies to FIGS. 13A to 18D).

Example 1-2

A fuel cell B illustrated in FIG. 10B was prepared and evaluated as in Example 1 except that the composite material A was placed so that the anode opposed the second porous metal body. The results are indicated in FIG. 13.

Example 1-3

A fuel cell C illustrated in FIG. 10B was prepared and evaluated as in Example 1 except that the composite material B was placed so that the anode opposed the second porous metal body. The results are indicated in FIG. 14.

Example 1-4

A fuel cell D illustrated in FIG. 10B was prepared and evaluated as in Example 1 except that the composite material C was placed so that the anode opposed the second porous metal body. The results are indicated in FIG. 15.

Example 2-1

A fuel cell E illustrated in FIG. 10A was prepared and evaluated as in Example 1 except that the composite material D was used. The results are indicated in FIG. 16.

Example 2-2

A fuel cell F illustrated in FIG. 10A was prepared and evaluated as in Example 1 except that the composite material E was used. The results are indicated in FIG. 17.

Example 2-3

A fuel cell G illustrated in FIG. 10A was prepared and evaluated as in Example 1 except that the composite material F was used. The results are indicated in FIG. 18.

As illustrated in FIGS. 12 to 18, the fuel cells A to G that used the composite materials A to F had excellent gas diffusing properties.

REFERENCE SIGNS LIST

1: MEA, 1a: anode, 1b: solid electrolyte layer, 1c: cathode, 2, 2A to 2F: first porous metal body, 3: interconnector, 4: gas supply port, 5a, 5b: gas discharge port, 6: second porous metal body, 10, 10A, 10B: fuel cell, 101: void, 102: fiber portion, 102a: hollow space, 103: opening, 20: hydrogen production apparatus, 21: structure, 21a, 21c: porous layer, 21b: solid oxide electrolyte membrane, 22A: anode, 22B: cathode, 23A, 23B: plate member, 24: steam supply port, 25a, 25b: gas discharge port

The invention claimed is:

1. A fuel cell comprising:
a membrane electrode assembly (MEA) that includes a cathode, an anode, and a solid electrolyte layer disposed between the cathode and the anode, the solid electrolyte layer containing an ion-conducting solid oxide;
at least one first porous metal body arranged to oppose at least one of the cathode and the anode; and
an interconnector arranged to oppose the at least one first porous metal body, and the interconnector having a gas supply port and a gas discharge port formed therein,
wherein the at least one first porous metal body includes i) a porous metal body S that opposes the gas supply port and has a three-dimensional mesh-like skeleton, and ii) a porous metal body H that has a three-dimensional mesh-like skeleton and is other than the porous metal body S,
wherein a porosity Ps of the porous metal body S and a porosity Ph of the porous metal body H satisfy a relationship: Ps<Ph, and
wherein, in a view from a direction normal to a main surface of the at least one first porous metal body, two porous metal bodies H oppose each other with the porous metal body S therebetween.

2. The fuel cell according to claim 1, wherein the porous metal body S also opposes the gas discharge port and has a shape of a strip that extends along a shortest straight line that connects a center of the gas supply port and a center of the gas discharge port.

3. The fuel cell according to claim 1, wherein the porous metal body S has a shape of a circle or polygon with a center corresponding to a center of the gas supply port.

4. The fuel cell according to claim 1, wherein the porosity Ps is 85 vol % or more.

5. The fuel cell according to claim 1, wherein a surface of the interconnector opposing the at least one first porous metal body is smooth and flat.

6. The fuel cell according to claim 1, further comprising:
a second porous metal body that is stacked on the at least one first porous metal body and has a three-dimensional mesh-like skeleton.

7. The fuel cell according to claim 6, wherein the at least one first porous metal body and the second porous metal body are bonded, and
wherein, in a bonded portion of the at least one first porous metal body and the second porous metal body, the three-dimensional mesh-like skeleton of the at least one first porous metal body and the three-dimensional mesh-like skeleton of the second porous metal body are entangled.

8. The fuel cell according to claim 6, wherein the second porous metal body is disposed between the at least one first porous metal body and the cathode or anode, and
the second porous metal body has a pore size of 100 to 1000 µm.

9. The fuel cell according to claim 1, wherein the at least one first porous metal body opposes at least the anode.

10. The fuel cell according to claim 1, wherein a ratio of the porosity Ph to the porosity Ps is 1.05 to 2.

11. The fuel cell according to claim 1, wherein the porous metal body S has a pore size of 100 to 1000 µm, and the porous metal body H has a pore size of 300 to 3500 µm.

12. The fuel cell according to claim 1, wherein, in the view from the direction normal to the main surface of the at least one first porous metal body, each porous metal body H of the two porous metal bodies H has a semicircular shape, and the semicircular shapes of the two porous metal bodies H oppose each other with the porous metal body S therebetween.

* * * * *